United States Patent
Bhagavath et al.

(10) Patent No.: US 12,019,984 B2
(45) Date of Patent: Jun. 25, 2024

(54) MULTI-LINGUAL INTENT MODEL WITH OUT-OF-DOMAIN DETECTION

(71) Applicant: Salesforce, Inc., San Francisco, CA (US)

(72) Inventors: Shilpa Bhagavath, Mountain View, CA (US); Shubham Mehrotra, Santa Clara, CA (US); Abhishek Sharma, Fremont, CA (US); Shashank Harinath, Santa Clara, CA (US); Na Cheng, Yarrow Point, WA (US); Zineb Laraki, Atherton, CA (US)

(73) Assignee: Salesforce, Inc., San Francisco, CA (US)

(*) Notice: Subject to any disclaimer, the term of this patent is extended or adjusted under 35 U.S.C. 154(b) by 270 days.

(21) Appl. No.: 17/479,748

(22) Filed: Sep. 20, 2021

(65) Prior Publication Data
US 2023/0086302 A1  Mar. 23, 2023

(51) Int. Cl.
*G06F 40/263* (2020.01)
*G06F 18/2415* (2023.01)
(Continued)

(52) U.S. Cl.
CPC ........ *G06F 40/263* (2020.01); *G06F 18/2415* (2023.01); *G06F 18/2431* (2023.01);
(Continued)

(58) Field of Classification Search
CPC .............. G06F 40/263; G06F 18/2415; G06F 18/2431; G06F 40/35; G06F 40/58; G06F 18/2433; G06F 40/30; G10L 15/22
See application file for complete search history.

(56) References Cited

U.S. PATENT DOCUMENTS

| | | | |
|---|---|---|---|
| 11,687,730 B1* | 6/2023 | Yang ..................... | G06N 20/00 704/9 |
| 2020/0097544 A1* | 3/2020 | Alexander .............. | G06F 40/35 |

(Continued)

OTHER PUBLICATIONS

Yang, Yinfei, et al. "Multilingual universal sentence encoder for semantic retrieval." arXiv preprint arXiv:1907.04307 (2019). (Year: 2019).*

(Continued)

*Primary Examiner* — Douglas Godbold
(74) *Attorney, Agent, or Firm* — Holland & Hart LLP

(57) ABSTRACT

A method that includes receiving an input at an interactive conversation service that uses an intent classification model. The method may further include generating, using an encoder model of the intent classification model, a set of output vectors corresponding to the input, where the encoder model is configured to determine a set of metrics corresponding to intent classifications. The method may further include determining, using an outlier detection model of the intent classification model, whether the input is in-domain or out-of-domain (OOD) based on a first vector of the set of output vectors satisfying a domain threshold relative to one or more of the intent classifications. The method may further include outputting, by the intent classification model, a second vector of the set of output vectors that indicates the set of metrics corresponding to the intent classifications or an indication that the input is OOD.

20 Claims, 13 Drawing Sheets

(51) Int. Cl.
  *G06F 18/2431* (2023.01)
  *G06F 40/35* (2020.01)
  *G06F 40/58* (2020.01)
  *G10L 15/22* (2006.01)

(52) U.S. Cl.
  CPC .............. *G06F 40/35* (2020.01); *G06F 40/58* (2020.01); *G10L 15/22* (2013.01)

(56) References Cited

U.S. PATENT DOCUMENTS

| | | | | |
|---|---|---|---|---|
| 2020/0097563 | A1* | 3/2020 | Alexander | G06F 16/61 |
| 2020/0257857 | A1* | 8/2020 | Peper | G06F 40/35 |
| 2020/0401855 | A1* | 12/2020 | Kim | G06F 18/254 |
| 2021/0150146 | A1* | 5/2021 | Alexander | G06F 40/30 |
| 2021/0303798 | A1* | 9/2021 | Duong | H04L 51/02 |
| 2022/0067279 | A1* | 3/2022 | Hirota | G06F 40/30 |
| 2022/0171946 | A1* | 6/2022 | Xu | G06F 40/35 |
| 2022/0171947 | A1* | 6/2022 | Xu | H04L 51/02 |
| 2022/0199070 | A1* | 6/2022 | Hsu | G06F 40/30 |
| 2022/0277143 | A1* | 9/2022 | Jayarao | G06F 40/30 |
| 2023/0072171 | A1* | 3/2023 | Sengupta | G06N 3/086 |

OTHER PUBLICATIONS

Yan, Guangfeng, et al. "Unknown intent detection using Gaussian mixture model with an application to zero-shot intent classification." Proceedings of the 58th annual meeting of the association for computational linguistics. 2020. (Year: 2020).*

Ren, Fuji, and Siyuan Xue. "Intention detection based on siamese neural network with triplet loss." IEEE Access 8 (2020): 82242-82254. (Year: 2020).*

Yang, Xingwei, Longin Jan Latecki, and Dragoljub Pokrajac. "Outlier detection with globally optimal exemplar-based GMM." Proceedings of the 2009 SIAM international conference on data mining. Society for Industrial and Applied Mathematics, 2009. (Year: 2009).*

* cited by examiner

MULTI-LINGUAL INTENT MODEL WITH OUT-OF-DOMAIN DETECTION

FIELD OF TECHNOLOGY

The present disclosure relates generally to database systems and data processing, and more specifically to an intent model with out-of-domain (OOD) detection.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform may support a chat bot that uses a machine learning model to determine an intent associated with a chat utterance. For example, if a user posts a chat utterance into an interactive chat service, the chat bot may be capable of determining that the chat utterance is directed to scheduling a meeting, reserving a flight, or returning an item, among other examples. The chat bot may respond to the user (e.g., within the interactive chat service) based on the determined intent. In some cases, however, the chat bot may be configured for a specific language. If the chat utterance is not associated with this specific language, the chat bot may be unable to correctly determine the intent of the chat utterance, which may reduce the utility of the chat bot.

DETAILED DESCRIPTION

Figure 1:
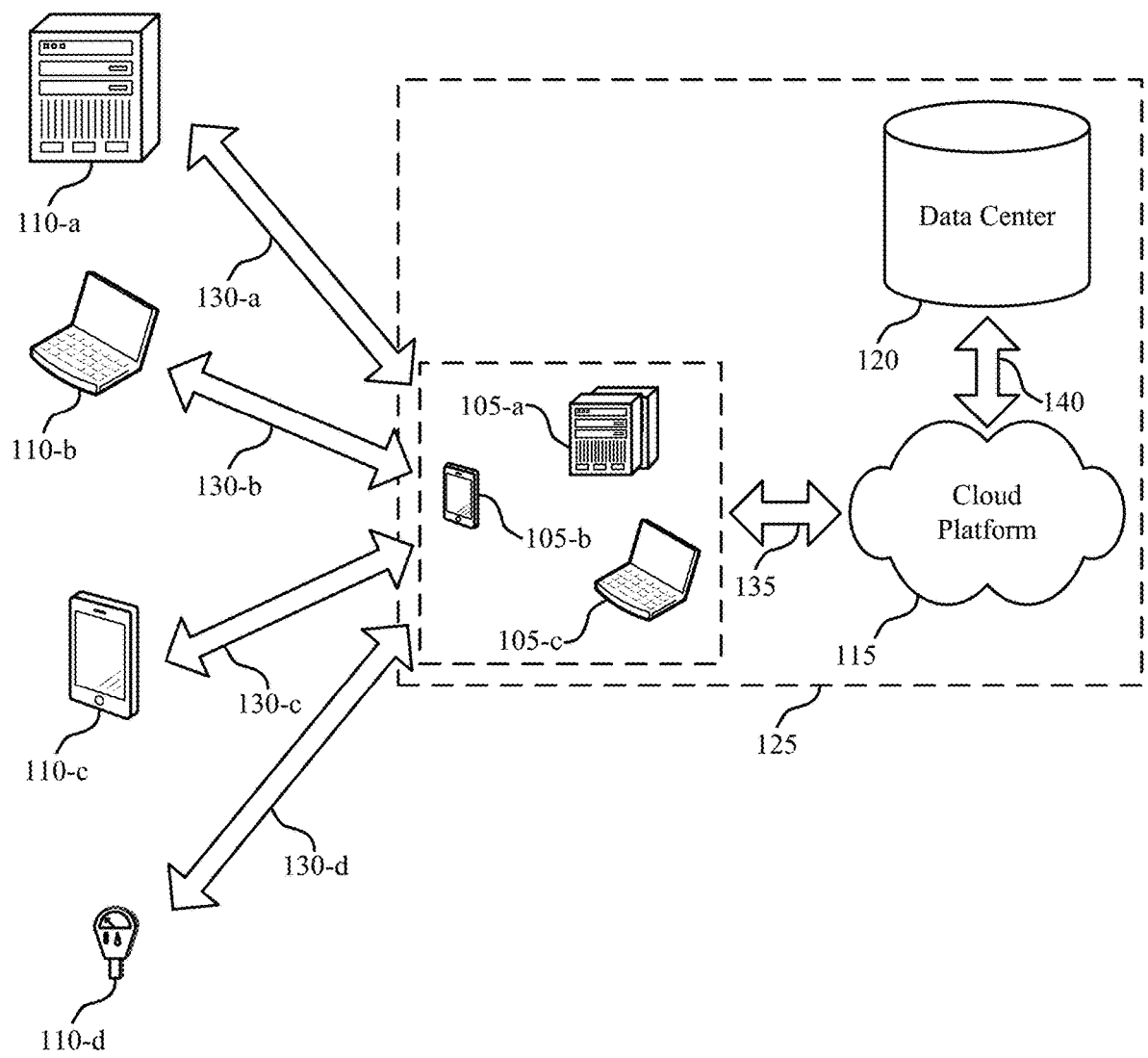
FIG. 1 illustrates an example of a data processing system that supports a multi-lingual intent model with out-of-domain (OOD) detection in accordance with aspects of the present disclosure.

In some data processing systems, a cloud platform may support a chat bot that uses a machine learning model to determine an intent associated with a chat utterance. For example, if a user (e.g., a customer) posts a chat utterance into an interactive chat service, the chat bot may be capable of determining that the chat utterance is directed to scheduling a meeting, reserving a flight, or returning an item, among other examples. The chat bot may respond to the user (e.g., within the interactive chat service) based on the determined intent. In some cases, the chat bot may be configured with various rules that define how the chat bot responds to different intents. For example, the chat bot may be configured to suggest a meeting time in response to determining that a chat utterance is directed to scheduling a meeting. Alternatively, the chat bot may be configured to display available flight information in response to determining that a chat utterance is directed to reserving a flight.

The chat bot may also be configured to determine whether the intent of a chat utterance is in-domain or out-of-domain (OOD). An intent that is in-domain may refer to an intent that is supported by the chat bot (e.g., within a domain of the chat bot). For example, if the chat bot receives a chat utterance related to a refund policy and the chat bot is configured with a set of rules for how to respond to chat utterances related to refund policies, the intent of the chat utterance (e.g., refund policy) may be considered in-domain. Alternatively, if the chat bot receives a chat utterance related to finding nearby store locations and the chat bot is not configured to respond or otherwise handle chat utterances related to finding nearby store locations, the chat utterance may be considered OOD (e.g., outside the domain of the chat bot). The chat bot may be configured with various rules or actions to perform when the chat bot receives a chat utterance with an intent that is OOD.

In some cases, however, the chat bot may be configured for a specific language. If the chat bot receives a chat utterance that is not associated with this specific language, the chat bot may be unable to correctly determine the intent of the chat utterance. Likewise, the chat bot may be unable to determine if the intent of the chat utterance is in-domain or OOD, which may reduce the overall utility of the chat bot. To support chat bot functionality for different languages, chat bot developers (e.g., administrators) may be required to configure and train a different chat bots and the machine learning models for each language, which may be associated with prohibitive memory usage, increased maintenance overhead, and processing inefficiencies. For example, if multiple chat bots exist for the same purpose but for different languages, a change to a response rule associated with a particular intent may require that an administrator manually input the rule for each language.

Aspects of the present disclosure may provide for configuring an intent classification model to support multiple languages. The intent classification model may include an encoder model (e.g., an in-domain model) and an outlier detection model (e.g., an OOD model). The encoder model may be configured to identify or otherwise classify the intent of a chat utterance, and the outlier detection model may be configured to determine whether the intent identified by the encoder model is in-domain or OOD. The encoder model may be trained using labeled data (e.g., supervised training), and may leverage various types of loss functions (e.g., triplet semi-hard loss, cross-entropy loss). The use of multiple loss functions may improve the accuracy and precision of the encoder model. The outlier detection model may be an example of a Gaussian mixture model (GMM) fit on in-domain vectors. The GMM may be configured for an in-domain space, and may be used to determine whether an input vector is in-domain or OOD (e.g., whether an input vector is outside an in-domain space). To support OOD detection at the GMM, a Gaussian process search may be used to determine suitable hyperparameters (e.g., thresholds) with respect to each input vector in an in-domain dataset (e.g., an in-domain dataset corresponding to a tenant or customer). The techniques described herein may enable the intent classification model to support multiple languages, which may result in lower memory usage, greater processing efficiency, and more precise intent classification, among other benefits.

Aspects of the disclosure are initially described in the context of an environment supporting an on-demand database service. Aspects of the disclosure are illustrated by and described with reference to data processing models and process flows. Aspects of the disclosure are further illustrated by and described with reference to apparatus diagrams, system diagrams, and flowcharts that relate to an intent model with OOD detection.

FIG. 1 illustrates an example of a data processing system 100 for cloud computing that supports a multi-lingual intent model with OOD detection in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, a cloud platform 115, and data center 120. In some cases, data processing may occur at any of the components of subsystem 125, or at a combination of these components. In some cases, servers may perform the data processing. The servers may be a cloud client 105 or located at data center 120.

In some data processing systems, a cloud platform 115 may support a chat bot that uses a machine learning model to determine an intent associated with a chat utterance. For example, if a user (e.g., a cloud client 105) posts a chat utterance (e.g., a query) into an interactive chat service, the chat bot may be capable of determining that the chat utterance is directed to scheduling a meeting, reserving a flight, or returning an item, among other examples. The chat bot may respond to the user (e.g., within the interactive chat service) based on the determined intent. In some cases, the chat bot may be configured with various rules (e.g., logic) that define how the chat bot responds to different intents. For example, the chat bot may be configured to suggest a meeting time in response to determining that a chat utterance is directed to scheduling a meeting. Alternatively, the chat bot may be configured to display available flight information in response to determining that a chat utterance is directed to reserving a flight.

The chat bot may also be configured to determine whether the intent of a chat utterance is in-domain or OOD. An intent that is in-domain may refer to an intent that is supported by the chat bot (e.g., within a domain of the chat bot). For example, if the chat bot receives a chat utterance related to a refund policy and the chat bot is configured with a set of rules for how to respond to chat utterances related to refund policies, the intent of the chat utterance (e.g., refund policy) may be considered in-domain. Alternatively, if the chat bot receives a chat utterance related to finding nearby store locations and the chat bot is not configured to respond or otherwise handle chat utterances related to finding nearby store locations, the chat utterance may be considered OOD (e.g., outside the domain of the chat bot). The chat bot may be configured with various rules or actions to perform when the chat bot receives a chat utterance that is OOD.

In some cases, however, the chat bot may be configured for a specific language. If the chat bot receives a chat utterance that is not associated with this specific language, the chat bot may be unable to correctly determine the intent of the chat utterance. Likewise, the chat bot may be unable to determine if the intent of the chat utterance is in-domain or OOD, which may reduce the overall utility of the chat bot. To support chat bot functionality for different languages, chat bot developers (e.g., administrators) may be required to configure and train a different chat bot (e.g., machine learning model) for each language, which may be associated with prohibitive memory usage, increased maintenance overhead, and processing inefficiencies.

Aspects of the present disclosure may provide for configuring an intent classification model to support multiple languages. The intent classification model may include an encoder model (e.g., an in-domain model) and an outlier detection model (e.g., an OOD model). The encoder model may be configured to identify or otherwise classify the intent of a chat utterance, and the outlier detection model may be configured to determine whether the intent identified by the encoder model is in-domain or OOD. The encoder model may be trained using labeled data (e.g., supervised training), and may leverage various types of loss functions (e.g., triplet semi-hard loss, cross-entropy loss). The use of these multiple loss functions may improve the accuracy and precision of the encoder model. In some examples, a Gaussian process search may be used to compute various thresholds for determining if an intent is in-domain or OOD. The techniques described herein may enable the intent classification model to support multiple languages, which may result in lower memory usage, greater processing efficiency, and more precise intent classification, among other benefits.

It should be appreciated by a person skilled in the art that one or more aspects of the disclosure may be implemented to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
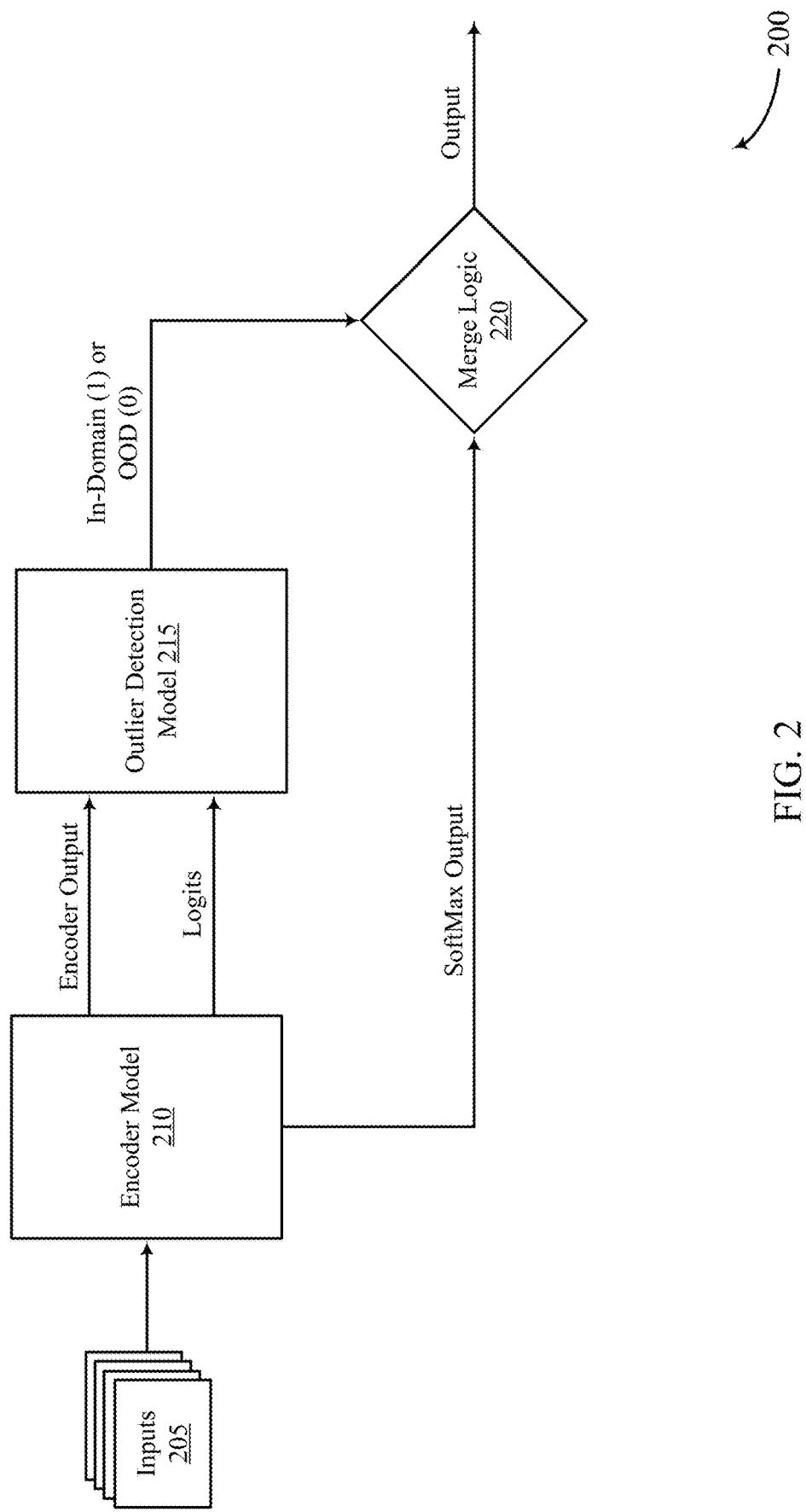
FIGS. 2 through 5 illustrate examples of data processing models that support an intent model with OOD detection in accordance with aspects of the present disclosure.

FIG. 2 illustrates an example of a data processing model 200 that supports a multi-lingual intent model with OOD detection in accordance with aspects of the present disclosure. The data processing model 200 may implement or be implemented by aspects of the data processing system 100. For example, the data processing model 200 may include an encoder model 210 and an outlier detection model 215, which may be supported by a cloud platform 115 described with reference to FIG. 1. The data processing model 200 may illustrate an example of a computing architecture that supports multi-lingual intent classification at an interactive conversation service.

In the example of FIG. 2, the encoder model 210 (e.g., an in-domain model) may receive a set of inputs 205. The set of inputs 205 may include various chat utterances labeled with different intent classifications. The encoder model 210 may generate an encoder output, a logits (e.g., a vector of raw, unnormalized predictions associated with intents), and a SoftMax output (e.g., vector of normalized probabilities or a probability distribution for the intents) based on the set of inputs 205. As described with reference to FIG. 3, the encoder model 210 may include a single layer transformer, an encoder layer, a dropout function, a Gaussian noise function, and a dense or average function. The encoder model 210 may use a combination of triplet semi-hard loss and cross-entropy loss to refine the encoder output as well as the logits. The encoder model 210 may transmit the encoder output and the logits to the outlier detection model 215, and may transmit the SoftMax output to a merge logic component 220.

Upon receiving the encoder output and the logits (both being output vectors of the encoder model) from the encoder model 210, the outlier detection model 215 may determine whether the set of inputs 205 is in-domain or OOD. In some examples, a Gaussian process search may be used in combination with an objective function to determine domain thresholds for a set of intent classifications (e.g., during training of the outlier detection model 215). As described with reference to FIG. 4, the Gaussian process search may determine these domain thresholds by applying a score to a set of possible threshold distances and selecting the threshold distance that results in the highest correlation between the set of inputs 205 (e.g., utterances) and the set of intent classifications. If an input from the set of inputs 205 is outside a threshold distance for an intent classification, the outlier detection model 215 may determine that the input is OOD. Alternatively, if an input from the set of inputs 205 is within a threshold distance for an intent classification, the outlier detection model 215 may determine that the input is in-domain. The outlier detection model 215 may repeat this process for each input in the set of inputs 205. The outlier detection model 215 may use both the logits and the encoder output (e.g., normalized encoder output with triplet loss) to determine whether the corresponding input is in-domain or OOD. In some cases, the outlier detection model 215 may select the result that is associated with a highest score.

Accordingly, the outlier detection model 215 may transmit an indication of this determination to the merge logic component 220. Specifically, the outlier detection model 215 may transmit a first bit value (e.g., 1) to indicate that an input is in-domain or a second bit value (e.g., 0) to indicate that an input is OOD. The merge logic component 220 may generate an output based on the SoftMax output received from the encoder model 210 and the domain indication bits received from the outlier detection model 215 For example, if the outlier detection model 215 determines that the input is OOD, then the merge logic 220 outputs an indication that the input is OOD. If the outlier detection model 215 determines that the input is in-domain, then the merge logic 220 may output the SoftMax output. Both of these outputs may be fed to a rule or response logic system to determine the appropriate response to the input. Using the encoder model 210 in combination with the outlier detection model 215 may enable the data processing model 200 (e.g., an intent classification model) to identify cross-lingual intent and perform OOD detection on a multi-lingual data set.

The techniques and operations described herein may improve the accuracy, precision, and utility of the data processing model 200. For example, aspects of the present disclosure may enable the data processing model 200 to perform intent classification on the set of inputs 205 (e.g., chat utterances associated with a variety of different languages), as opposed to configuring different intent classification models for different languages. In addition, the techniques and operations described herein may improve the likelihood of the data processing model 200 correctly determining whether an input from the set of inputs 205 corresponds to a specific intent classification by using multiple types of loss (e.g., triplet semi-hard loss, cross-entropy loss) to refine output vectors generated by the encoder model 210 during training. Using different types of loss to refine output vectors from the encoder model 210 may also enable the outlier detection model 215 to perform OOD detection with greater accuracy.

Figure 3:
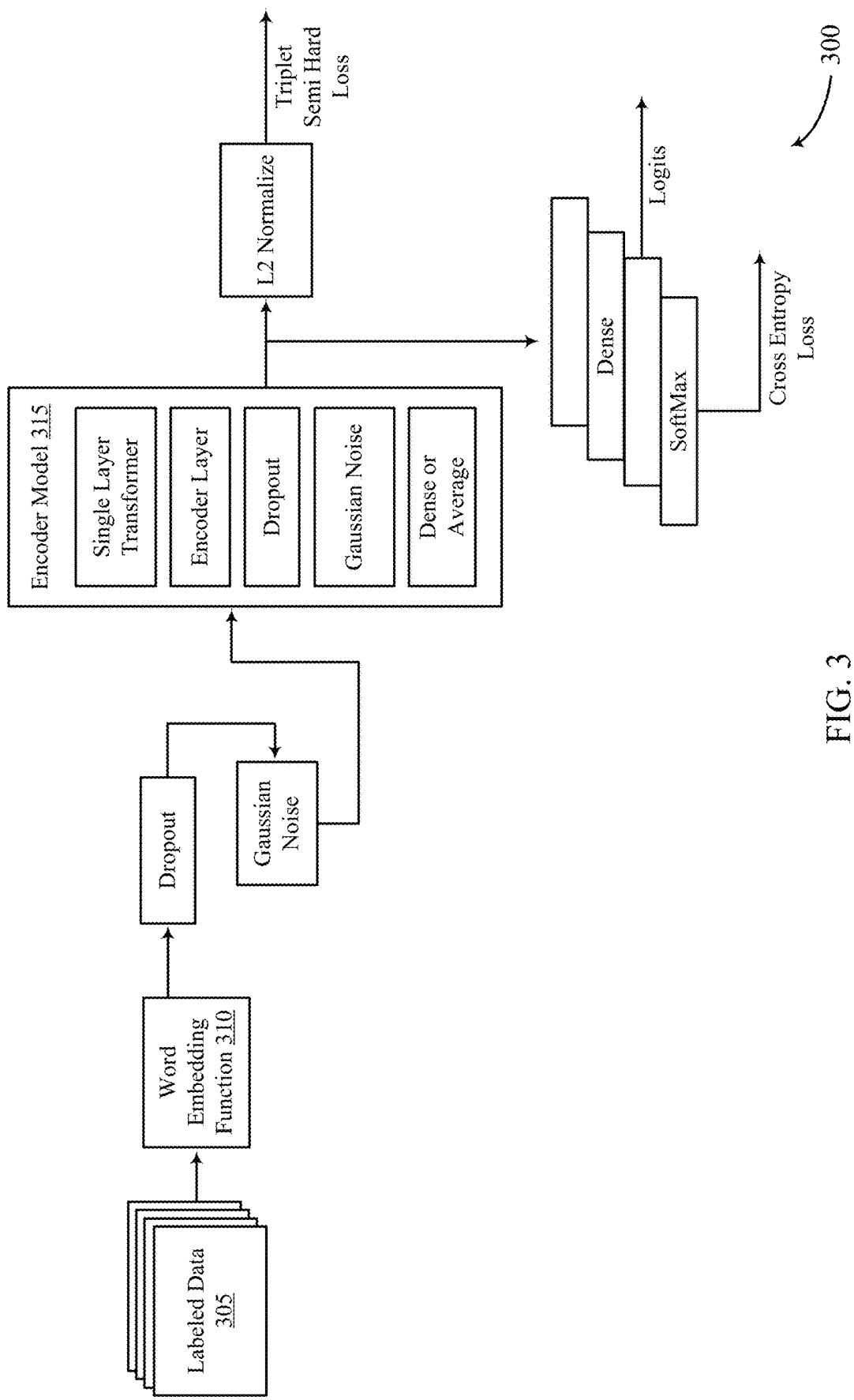

FIG. 3 illustrates an example of a data processing model 300 that supports a multi-lingual intent model with OOD detection in accordance with aspects of the present disclosure. The data processing model 300 may implement or be implemented by aspects of the data processing system 100 or the data processing model 200. For example, the data processing model 300 may include an encoder model 315, which may be an example of an encoder model 210 described with reference to FIG. 2. The data processing model 300 may illustrate an example of an in-domain model that supports multi-lingual intent classification at an interactive conversation service.

In the example of FIG. 3, a word embedding function 310 may receive labeled data 305 (e.g., a set of inputs 205 described with reference to FIG. 2). The labeled data 305 may include one or more chat utterances, labels, and language elements. The word embedding function 310 (e.g., a Bidirectional Encoder Representations from Transformers (BERT) word embedding function) may modify (e.g., augment) and output vectors corresponding to the labeled data 305 to one or both of a dropout function and a Gaussian noise function. The output of the Gaussian noise function may be ingested by the encoder model 315, which may include a single layer transformer, an encoder layer, a dropout component, a Gaussian noise component, and a dense or average component.

The encoder model 315 may generate a set of output vectors (e.g., logits, SoftMax output, normalized encoder output) based processing the labeled data 305. A layer 2 (L2) normalization component may process the output of the encoder model to support triplet semi-hard loss to refine the encoder model 315. Additionally, a classification loss function may process the output of the encoder model to support classification loss to refine the encoder model 315. The classification loss function may include a dense function and a SoftMax function. This classification loss function may generate a logits and cross-entropy loss based on one or both of the set of output vectors and the set of metrics. Thus, during training, the triplet loss and the classification loss are used to refine the encoder model 315. During run-time, the logits and a normalized output with the triplet semi-hard loss may be processed by an OOD model, which may use this information to perform OOD detection on the labeled data 305. In some examples, the encoder model 315, the triplet semi-hard loss, and the cross-entropy loss may be implemented in one or more TensorFlow models.

The techniques and operations described herein may improve the accuracy, precision, and utility of the data processing model 300. For example, aspects of the present disclosure may enable the data processing model 300 to perform intent classification on the labeled data 305 (e.g., chat utterances associated with a variety of different languages), as opposed to configuring different intent classification models for different languages. In addition, the techniques and operations described herein may improve the likelihood of the data processing model 300 correctly determining whether the labeled data 305 corresponds to a specific intent classification by using two different types of loss (e.g., triplet semi-hard loss, cross-entropy loss) to refine output vectors generated by the encoder model 315. Using different loss types to refine output vectors from the encoder model 315 may also enable an outlier detection model (e.g., an outlier detection model 215 described with reference to FIG. 2) to perform OOD detection with greater precision.

Figure 4:
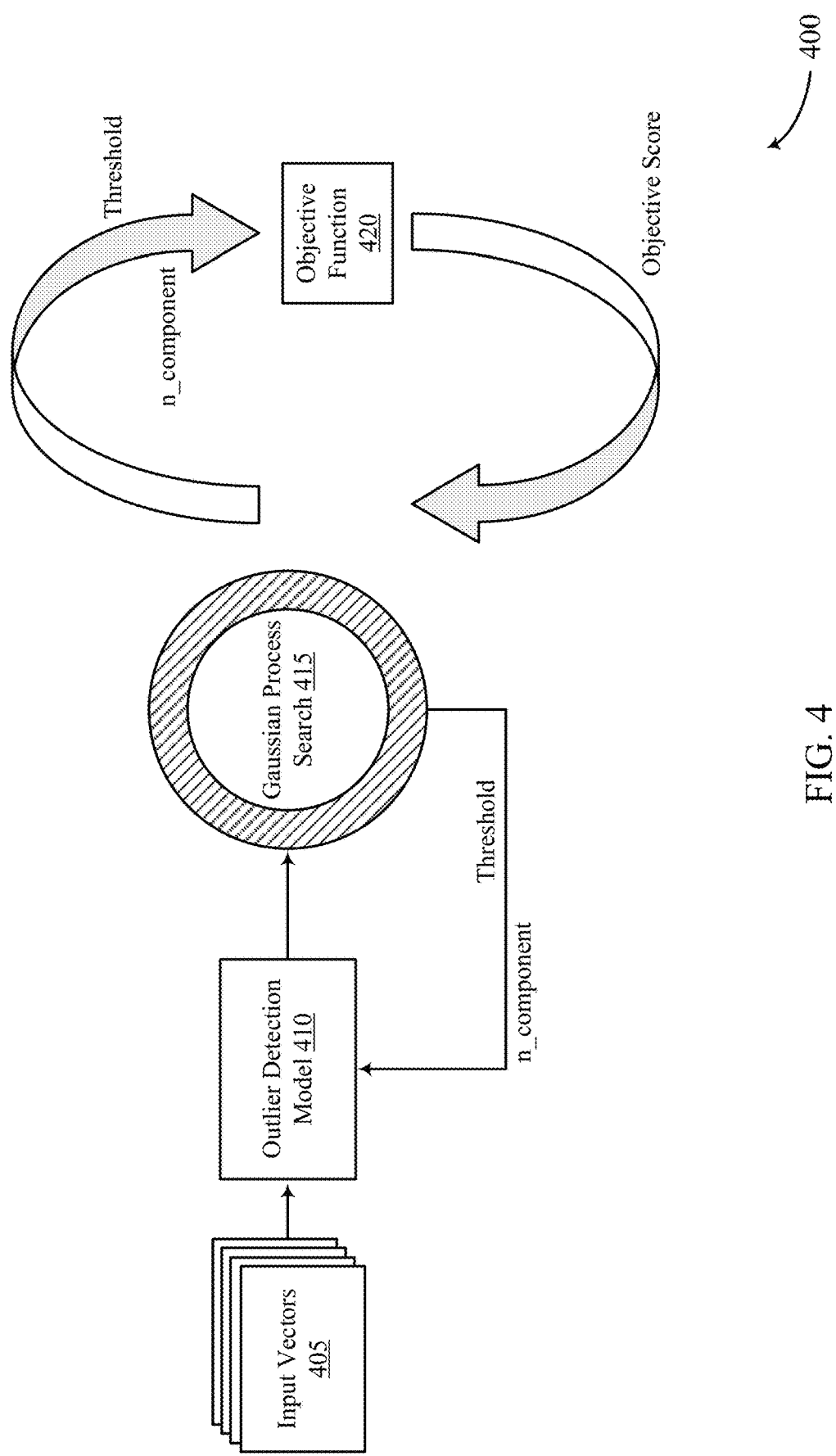

FIG. 4 illustrates an example of a data processing model 400 that supports a multi-lingual intent model with OOD detection in accordance with aspects of the present disclosure. The data processing model 400 may implement or be implemented by aspects of the data processing system 100, the data processing model 200, or the data processing model 300. For example, the data processing model 400 may include an outlier detection model 410, which may be an example of an outlier detection model 215 described with reference to FIG. 2. The data processing model 400 may illustrate an example of an OOD model that supports multi-lingual intent classification at an interactive conversation service.

In the example of FIG. 4, the outlier detection model 410 (e.g., a GMM) may receive a set of input vectors 405 from an in-domain model (e.g., the data processing model 300 described with reference to FIG. 3). The outlier detection model 410 may be fit (e.g., trained) on input vectors (e.g., of various languages). The input vectors may be generated from the encoder model of FIG. 3. Thus, the input vectors which may include an encoder output (e.g., a normalized encoder output with triplet semi-hard loss) and a logits. As such, the input vectors used for training or fitting may be "in-domain" vectors, as each of the input vectors may correspond to a particular intent classification.

After training or fitting the model on the in-domain vectors, the outlier detection mode 410 may identify thresholds (e.g., hyperparameters) using a Gaussian process search for determining whether subsequent inputs are in-domain or OOD. As this process may be used for models for various tenants that have different datasets, the Gaussian process search 415 may determine different thresholds for different in-domain datasets (e.g., in-domain datasets corresponding to different tenants or customers). The Gaussian process search 415 may include an objective function 420 that generates objective scores for various potential threshold distances based on one or more input parameters (e.g., Threshold, n_component). The input parameters may include an initial domain threshold (e.g., Threshold) and an initial number of intent classifications (e.g., n_component). The outlier detection model 410 may use an iterative process to apply objective scores to a number of possible threshold distances and a number of possible intent classifications (e.g., starting from the initial domain threshold and the initial number of intent classification thresholds). The Gaussian process search 415 may output the domain threshold (or set of domain thresholds) that resulted in the highest objective score (e.g., based on whether the model correctly predicted intents according to the labeled training data) to the outlier detection model 410.

At run-time, according to techniques described herein, the outlier detection model 410 may receive the set of input vectors 405 from the encoder model (e.g., encoder model of FIG. 3). The set of input vectors 405 may include an encoder output (e.g., a normalized encoder output with triplet semi-hard loss) and a logits. Upon receiving the set of input vectors 405, the outlier detection model 410 may determine whether each input vector from the set of input vectors is in-domain or OOD using the trained outlier detection model 410 and using the identified thresholds corresponding to intents.

The outlier detection model 410 may use this domain threshold and corresponding number of intent classifications (e.g., the set of domain thresholds and the number of different intent clusters that resulted in the highest score from the objective function 420) to perform OOD detection on the set of input vectors 405 (e.g., which may include the logits and normalized encoder output with triplet semi-hard loss). For example, if an input vector from the set of input vectors 405 is within a domain threshold set by the Gaussian process search 415, the outlier detection model 410 may classify the input vector as in-domain. Alternatively, if an input vector from the set of input vectors is outside the domain threshold set by the Gaussian process search 415, the outlier detection model 410 may classify the input vector as OOD. The outlier detection model 410 may output a first bit value (e.g., 1) for input vectors classified as in-domain and a second bit value (e.g., 0) for input vectors classified as OOD. Because the outlier detection model 410 may use both the logits and the normalized encoder output vector determination, the outlier detection model 410 may output the decision that is associated with a highest score.

The techniques and operations described herein may improve the accuracy, precision, and utility of the data processing model 400. For example, aspects of the present disclosure may enable the data processing model 400 to perform intent classification on the set of input vectors 405 (e.g., normalized encoder outputs with triplet semi-hard loss, logits), as opposed to configuring different intent classification models for different languages. In addition, the techniques and operations described herein may improve the likelihood of the data processing model 400 correctly determining whether an input vector from the set of input vectors 405 corresponds to a specific intent classification because the model is trained using two types of loss (e.g., triplet semi-hard loss, cross-entropy loss) to refine output vectors generated by an encoder model (e.g., an encoder model 210 described with reference to FIG. 2). Thus, because the vectors are refined during training, the encoder model produces outputs or classifications with higher accuracy. Further, because the outputs are more accurate and precise, the output vectors from the encoder model may enable the outlier detection model 410 to perform OOD detection with greater precision.

Figure 5:
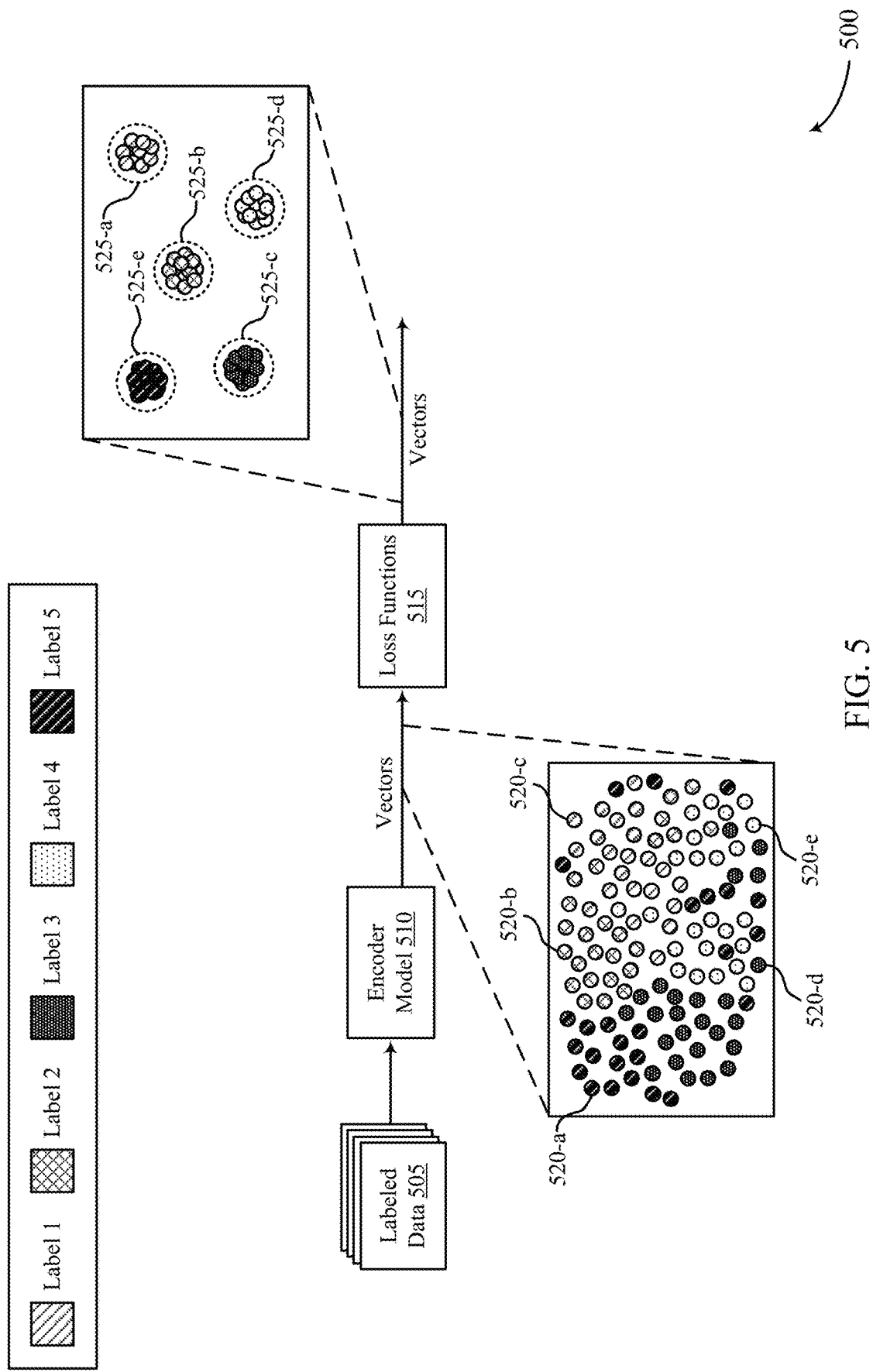

FIG. 5 illustrates an example of a data processing model 500 that supports a multi-lingual intent model with OOD detection in accordance with aspects of the present disclosure. The data processing model 500 may implement or be implemented by aspects of the data processing system 100, the data processing model 200, the data processing model 300, or the data processing model 400. For example, the data processing model 500 may include an encoder model 510, which may be an example of an encoder model 210 or an encoder model 315 described with reference to FIGS. 2 and 3. The data processing model 500 may illustrate an example of how loss functions 515 can be used to fine-tune (e.g., refine) output vectors generated by the encoder model 510.

In the example of FIG. 5, the encoder model 510 may receive labeled data 505 (e.g., labeled data 305 described with reference to FIG. 3) in accordance with a supervised training scheme. The labeled data 505 may include utterances 520 labeled with a corresponding set of intent classifications. For example, the labeled data 505 may include an utterance 520-a labeled with a first intent classification (e.g., Label 1), an utterance 520-b labeled with a second intent classification (e.g., Label 2), an utterance 520-c labeled with a third intent classification (e.g., Label 3), an utterance 520-d labeled with a fourth intent classification (e.g., Label 4), and an utterance 520-e labeled with a fifth intent classification (e.g., Label 5). The encoder model 510 may generate a set of output vectors (e.g., an encoder output, logits, and a SoftMax output) based on the labeled data 505, as described with reference to FIG. 3.

As illustrated in the example of FIG. 5, the set of output vectors may be associated with high variability and low precision prior to implementing the loss functions 515. The loss functions 515 may include a triplet loss function (e.g., semi-hard loss function), a classification loss function (e.g., cross-entropy loss function or a contrastive loss function), among other examples. The use of the loss functions 515 may fine-tune (e.g., refine) the set of output vectors from the encoder model 510 such that the set of output vectors is associated with high precision and low variability. Specifically, the loss functions 515 may separate (e.g., pull apart) utterances 520 that are associated with different intent classifications, and may cluster (e.g., push together) utterances 520 that are associated with different intent classifications. The triplet loss function may use various combinations (e.g., rather than permutations) of utterances 520 within a mini-batch to determine whether the utterances 520 correspond to the same intent classification or to different intent classifications such as to refine the outputs during training After the loss functions 515 are used to refine the set of output vectors, the set of output vectors may form clusters 525 (e.g., intent clusters), each of which may correspond to a different intent classification. For example, a cluster 525-a may include utterances 520 that correspond to the first intent classification (e.g., Label 1), a cluster 525-b may include utterances 520 that correspond to the second intent classification (e.g., Label 2), a cluster 525-c may include utterances 520 that correspond to the third intent classification (e.g., Label 3), a cluster 525-d may include utterances 520 that correspond to the fourth intent classification (e.g., Label 4), and a cluster 525-e may include utterances 520 that correspond to the fifth intent classification (e.g., Label 5). Refining the output vectors such that the utterances 520 form clusters 525 (e.g., relatively tighter clusters) may enable an outlier detection model (e.g., the outlier detection model 215) to perform OOD detection on the utterances 520 with greater precision.

The techniques and operations described herein may improve the accuracy, precision, and utility of the data processing model 500. For example, aspects of the present disclosure may enable the data processing model 500 to perform intent classification on the labeled data 505 (e.g., chat utterances associated with a variety of different languages), as opposed to configuring different intent classification models for different languages. In addition, the techniques and operations described herein may improve the likelihood of the data processing model 500 correctly determining whether the utterances 520 correspond to a specific intent classification by using different types of loss (e.g., triplet semi-hard loss, cross-entropy loss) to refine output vectors generated by the encoder model 510 to train the encoder model 10. Using different types of loss during training to refine output vectors from the encoder model 510 may enable an outlier detection model (e.g., an outlier detection model 410 described with reference to FIG. 4) to perform OOD detection on the utterances 520 with greater precision.

Figure 6:
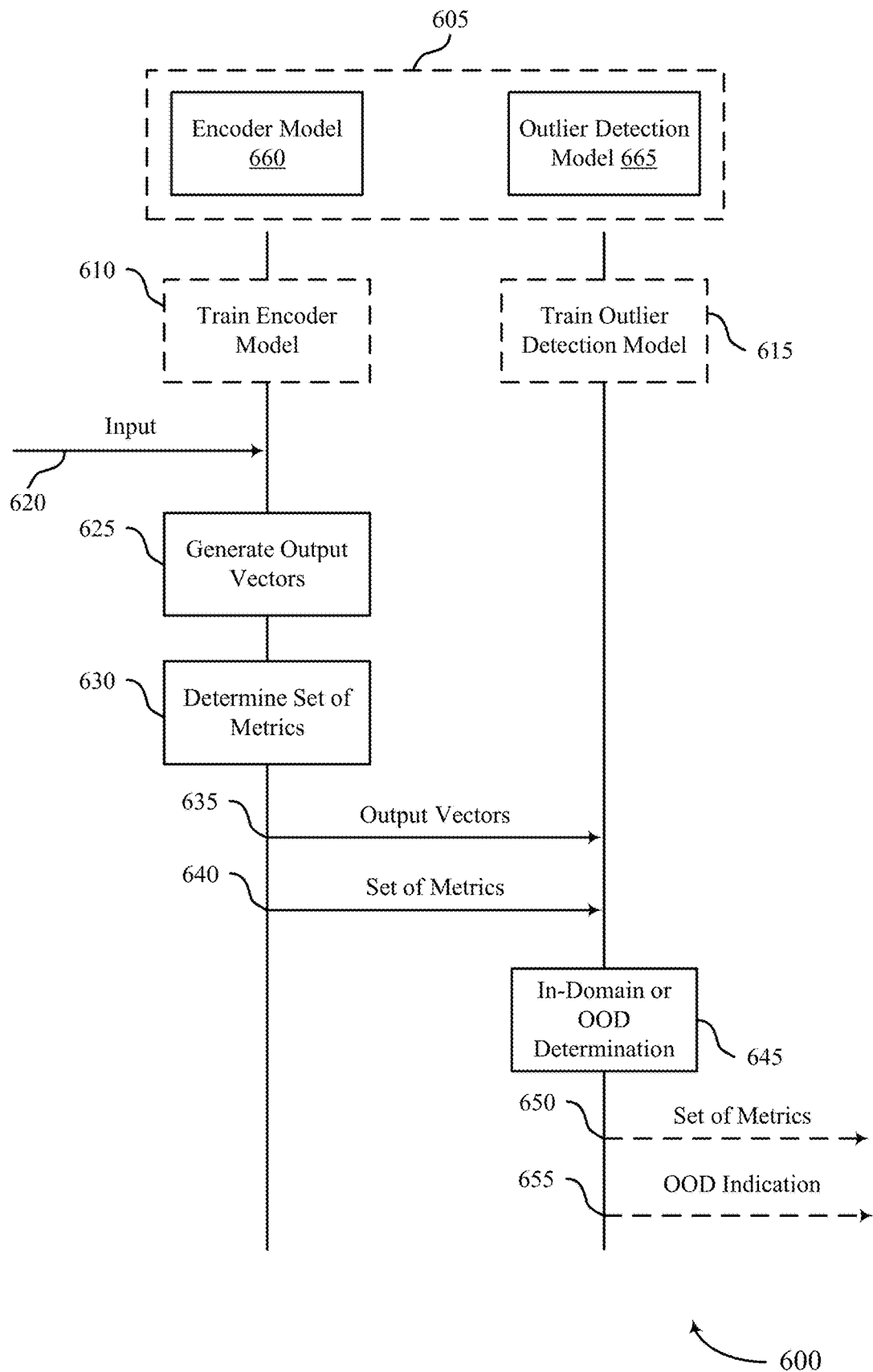
FIG. 6 illustrates an example of a process flow that supports a multi-lingual intent model with OOD detection in accordance with aspects of the present disclosure.

FIG. 6 illustrates an example of a process flow 600 that supports a multi-lingual intent model with OOD detection in accordance with aspects of the present disclosure. The process flow 600 may implement or be implemented by aspects of the data processing system 100, the data processing model 200, the data processing model 300, the data processing model 400, or the data processing model 500. For example, the process flow 600 may include an intent classification model 605 that includes an encoder model 660 and an outlier detection model 665, which may be examples of corresponding models described with reference to FIGS. 1 through 5. In the following description of the process flow 600, operations between the encoder model 660 and the outlier detection model 665 may be performed in a different order or at a different time than as shown. Additionally or alternatively, some operations may be omitted from the process flow 600, and other operations may be added to the process flow 600.

At 610, the encoder model 660 (e.g., of the intent classification model 605) may be trained using a set of inputs that includes multiple languages, where each input of the set of inputs is labeled with an intent classification from a set of intent classifications. The encoder model 660 may be trained using both a triplet loss function and a classification loss function. However, it is to be understood that other loss functions (e.g., a contrastive loss function) may also be used to train the encoder model 660. The triplet loss function and the cross-entropy loss function may use outputs from the encoder model 660 to generate loss calculations to refine the encoder model such as to improve the accuracy and precision of output vectors generated by the encoder model 660.

At 615, the outlier detection model 665 (e.g., of the intent classification model 605) may be trained using the labeled set of inputs form multiple languages. In some cases, a Gaussian process search may be used to identify a threshold distance for determining whether an input vector corresponds to an intent classification from the set of intent classifications. An input vector may correspond to an intent classification from the set of intent classifications if, for example, the input vector is within the threshold distance from a vector related to the intent classification. In some examples, an objective function of the Gaussian process search may apply a score (to each threshold distance in a set of possible threshold distances based on an identified association between a set of input vectors and the set of intent classifications. For example, the score relates to the accuracy of the threshold that is used to determine whether a labeled input is in-domain or out of domain. Accordingly, a threshold distance with the highest applied score may be selected as a domain threshold for the outlier detection model 665. In some examples, a threshold distance may be selected for each intent classification in the set of intent classifications.

At 620, the encoder model 660 may receive an input (e.g., a chat utterance) from a user at an interactive conversation service that utilizes the intent classification model 605. At 625, the encoder model 660 may generate a set of output vectors (e.g., a normalized encoder output, a logits, and a SoftMax output) corresponding to the received input. At 630, the encoder model 660 may determine a set of metrics that indicate a likelihood (e.g., a probability distribution) of the input corresponding to the set of intent classifications (e.g., the output of the SoftMax function). At 635, the encoder model 660 may output the generated set of output vectors to the outlier detection model 665. Similarly, the encoder model 660 may output the determined set of metrics to the outlier detection model 665 at 640.

At 645, the outlier detection model 665 may determine whether the input is in-domain or OOD based on a first vector from the set of output vectors generated by the encoder model 660 (e.g., the logits or the normalized encoder output with triplet loss). Specifically, the outlier detection model 665 may determine whether the input is in-domain or OOD based on whether the first vector satisfies a domain threshold relative to the set of intent classifications. In some examples, the outlier detection model 665 may output a second vector from the set of output vectors at 650. The second vector may indicate the set of metrics determined by the encoder model 660. In other examples, the outlier detection model 665 may output an indication that the indication is OOD.

The techniques and operations described in the process flow 600 may improve the accuracy, precision, and utility of the intent classification model 605. For example, the techniques and operations described in the process flow 600 may enable the intent classification model 605 to perform intent classification on inputs (e.g., chat utterances) associated with different languages, as opposed to configuring different intent classification models for different languages. In addition, the techniques and operations described in the process flow 600 may improve the likelihood of the intent classification model 605 correctly determining whether an input corresponds to a specific intent classification by using loss functions (e.g., triplet semi-hard loss functions, cross-entropy loss functions) to refine output vectors generated by the encoder model 660.

Figure 7:
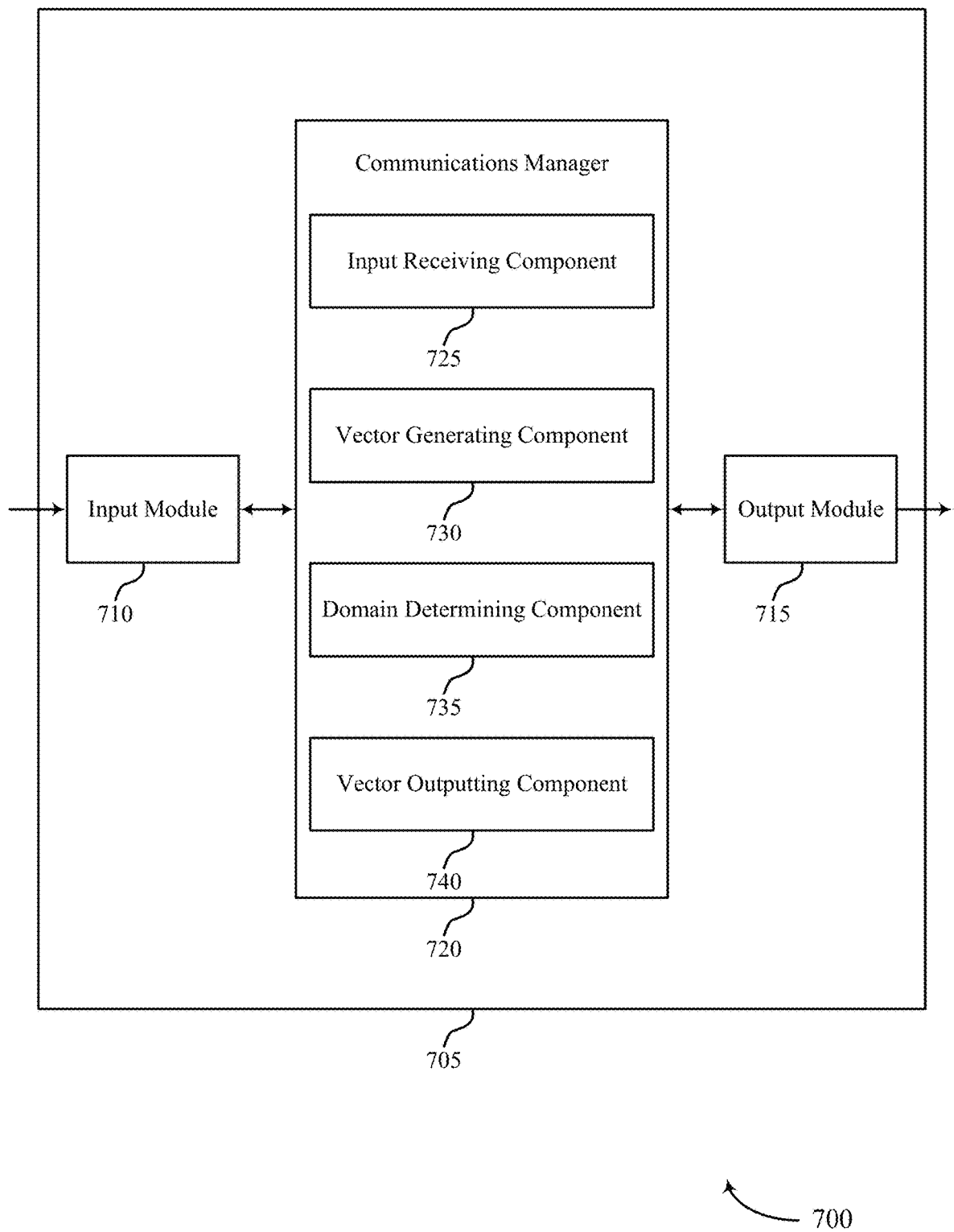
FIG. 7 shows a block diagram of an apparatus that supports a multi-lingual intent model with OOD detection in accordance with aspects of the present disclosure.

FIG. 7 shows a block diagram 700 of a device 705 that supports a multi-lingual intent model with OOD detection in accordance with aspects of the present disclosure. The device 705 may include an input module 710, an output module 715, and a communications manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the communications manager 720 to support an intent model with OOD detection. In some cases, the input module 710 may be a component of an input/output (I/O) controller 910 as described with reference to FIG. 9.

The output module 715 may manage output signals for the device 705. For example, the output module 715 may receive signals from other components of the device 705, such as the communications manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the communications manager 720 may include an input receiving component 725, a vector generating component 730, a domain determining component 735, a vector outputting component 740, or any combination thereof. In some examples, the communications manager 720, or various components thereof, may be configured to perform various operations (e.g., receiving, monitoring, transmitting) using or otherwise in cooperation with the input module 710, the output module 715, or both. For example, the communications manager 720 may receive information from the input module 710, send information to the output module 715, or be integrated in combination with the input module 710, the output module 715, or both to receive information, transmit information, or perform various other operations as described herein.

The communications manager 720 may support data processing in accordance with examples as disclosed herein. The input receiving component 725 may be configured as or otherwise support a means for receiving an input at an interactive conversation service that uses an intent classification model. The vector generating component 730 may be configured as or otherwise support a means for generating, using an encoder model of the intent classification model, a set of output vectors corresponding to the input, where the encoder model is configured to determine a set of metrics corresponding to multiple intent classifications. The domain determining component 735 may be configured as or otherwise support a means for determining, using an outlier detection model of the intent classification model, whether the input is in-domain or OOD based on a first vector of the set of output vectors satisfying a domain threshold relative to one or more of the multiple intent classifications. The vector outputting component 740 may be configured as or otherwise support a means for outputting, by the intent classification model, a second vector of the set of output vectors that indicates the set of metrics corresponding to the multiple intent classifications or an indication that the input is OOD based on the determining.

Figure 8:
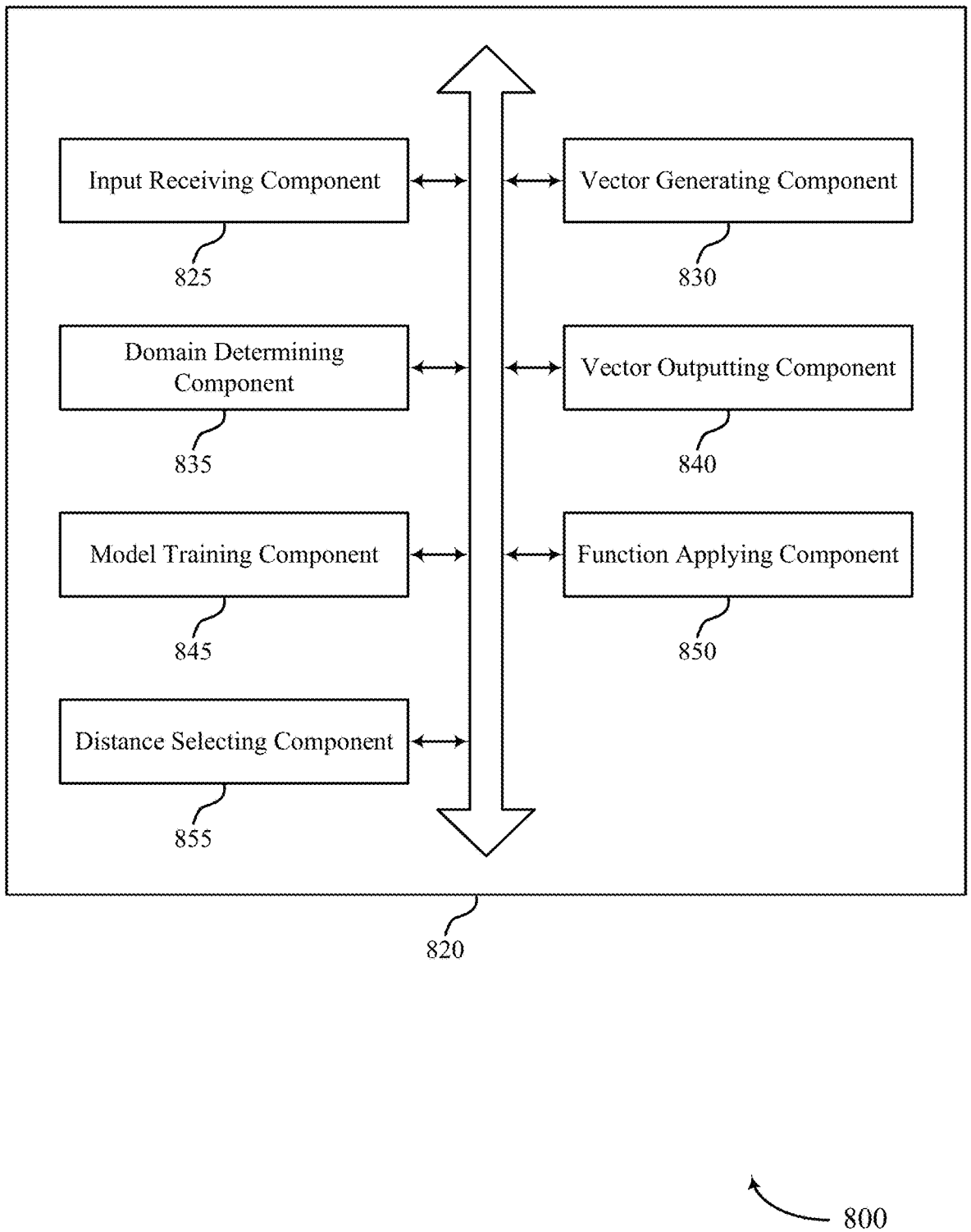
FIG. 8 shows a block diagram of a communications manager that supports a multi-lingual intent model with OOD detection in accordance with aspects of the present disclosure.

FIG. 8 shows a block diagram 800 of a communications manager 820 that supports a multi-lingual intent model with OOD detection in accordance with aspects of the present disclosure. The communications manager 820 may be an example of aspects of a communications manager or a communications manager 720, or both, as described herein. The communications manager 820, or various components thereof, may be an example of means for performing various aspects of an intent model with OOD detection as described herein. For example, the communications manager 820 may include an input receiving component 825, a vector generating component 830, a domain determining component 835, a vector outputting component 840, a model training component 845, a function applying component 850, a distance selecting component 855, or any combination thereof. Each of these components may communicate, directly or indirectly, with one another (e.g., via one or more buses).

The communications manager 820 may support data processing in accordance with examples as disclosed herein. The input receiving component 825 may be configured as or otherwise support a means for receiving an input at an interactive conversation service that uses an intent classification model. The vector generating component 830 may be configured as or otherwise support a means for generating, using an encoder model of the intent classification model, a set of output vectors corresponding to the input, where the encoder model is configured to determine a set of metrics corresponding to multiple intent classifications. The domain determining component 835 may be configured as or otherwise support a means for determining, using an outlier detection model of the intent classification model, whether the input is in-domain or OOD based on a first vector of the set of output vectors satisfying a domain threshold relative to one or more of the multiple intent classifications. The vector outputting component 840 may be configured as or otherwise support a means for outputting, by the intent classification model, a second vector of the set of output vectors that indicates the set of metrics corresponding to the multiple intent classifications or an indication that the input is OOD based on the determining.

In some examples, the model training component 845 may be configured as or otherwise support a means for training the encoder model of the intent classification model using a set of inputs that includes multiple languages, where each input of the set of inputs is labeled with an intent classification of the multiple intent classifications. In some examples, the encoder model comprises a word embedding function and a single layer transformer.

In some examples, the model training component 845 may be configured as or otherwise support a means for training the encoder model of the intent classification model using a triplet loss procedure and a classification loss procedure, where both the triplet loss procedure and the classification loss procedure use outputs of the encoder model for loss calculations. In some examples, the triplet loss procedure is a triplet semi-hard loss procedure and the classification loss procedure is a cross-entropy loss procedure.

In some examples, the outlier detection model of the intent classification model may include a GMM that is trained using a set of input vectors, each input vector of the set of input vectors corresponding to an intent classification of the multiple intent classifications. In some examples, the model training component 845 may be configured as or otherwise support a means for performing a Gaussian process search to identify a threshold distance that is used for determining whether an input vector corresponds to an intent classification of the multiple intent classifications, where determining whether the input vector corresponds to the intent classification is based on whether the input vector is within the threshold distance from a vector corresponding to the intent classification.

In some examples, to support training the outlier detection model, the function applying component 850 may be configured as or otherwise support a means for applying an objective function of the Gaussian process search that applies a score to each threshold distance of a set of possible threshold distances based on a set of input vectors being classified to the one or more of the multiple intent classifications. In some examples, to support training the outlier detection model, the distance selecting component 855 may be configured as or otherwise support a means for selecting a threshold distance from the set of possible threshold distances based on a highest score applied to the set of possible threshold distances.

In some examples, to support training the outlier detection model, the distance selecting component 855 may be configured as or otherwise support a means for selecting a threshold distance for each intent classification of the multiple intent classifications.

In some examples, to support determining whether the input is in-domain or OOD, the function applying component 850 may be configured as or otherwise support a means for applying a SoftMax function to one of the set of output vectors resulting in a logits. In some examples, to support determining whether the input is in-domain or OOD, the function applying component 850 may be configured as or otherwise support a means for applying a Gaussian mixture model of the outlier detection model to the logits and to a normalized output vector of the set of output vectors. In some examples, to support determining whether the input is in-domain or OOD, the domain determining component 835 may be configured as or otherwise support a means for determining whether the input is in-domain or OOD based on a highest score resulting from the Gaussian mixture model being applied to the logits and the normalized output vector, where the first vector corresponds to either the logits or the normalized output vector that results in the highest score.

In some examples, to support determining whether the input is in-domain or OOD, the domain determining component 835 may be configured as or otherwise support a means for determining, using the outlier detection model of the intent classification model, that the input is in-domain based on the first vector, where the second vector resulting from application of a SoftMax function is output by the intent classification model based on determining that the input is in-domain.

Figure 9:
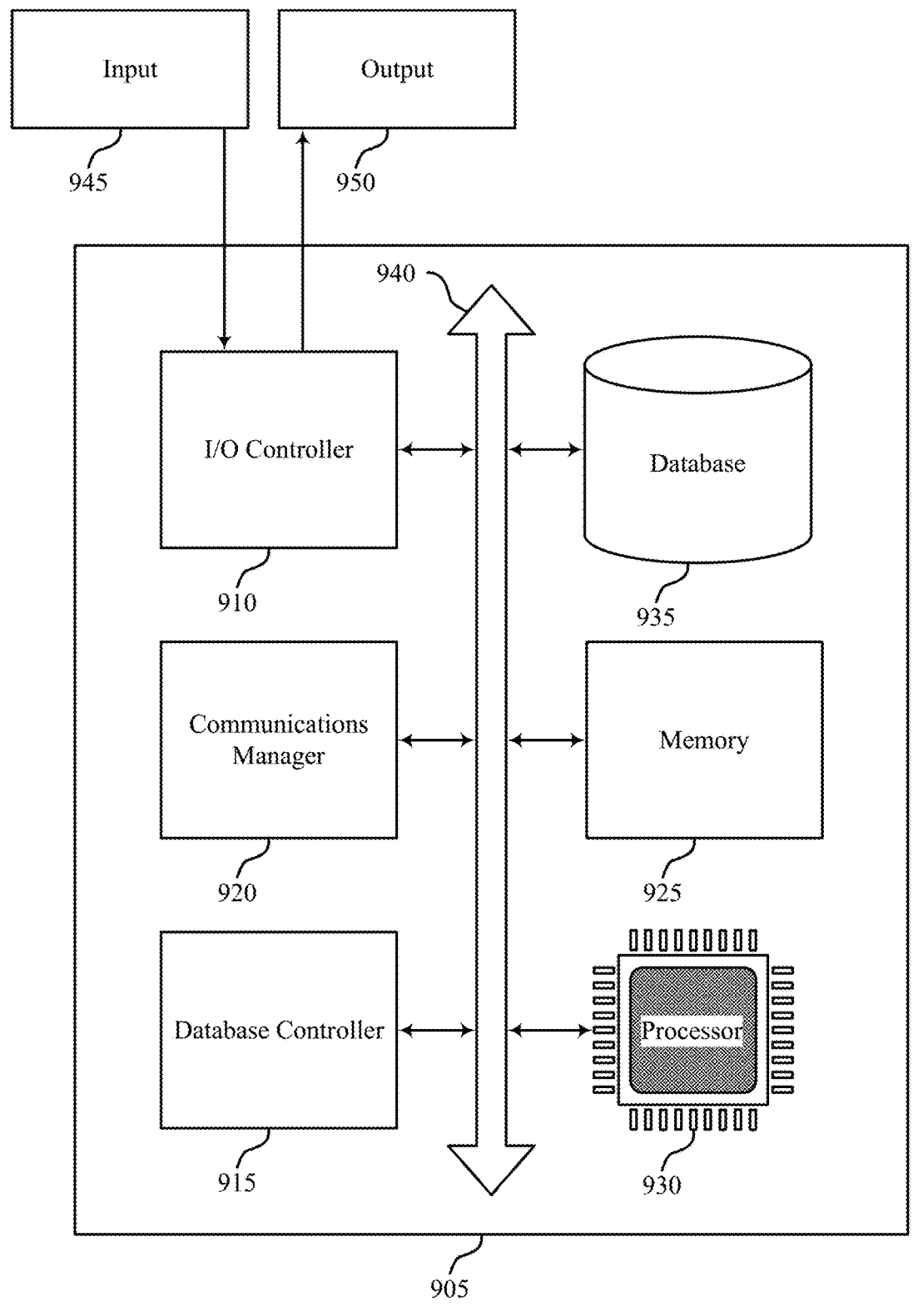
FIG. 9 shows a diagram of a system including a device that supports a multi-lingual intent model with OOD detection in accordance with aspects of the present disclosure.

FIG. 9 shows a diagram of a system 900 including a device 905 that supports a multi-lingual intent model with OOD detection in accordance with aspects of the present disclosure. The device 905 may be an example of or include the components of a device 705 as described herein. The device 905 may include components for data communications, including components for transmitting and receiving communications, such as a communications manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor 930 to perform various functions described herein. In some cases, the memory 925 may contain, among other things, a basic I/O system (BIOS), which may control basic hardware or software operation such as the interaction with peripheral components or devices.

The processor 930 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting an intent model with OOD detection).

The communications manager 920 may support data processing in accordance with examples as disclosed herein. For example, the communications manager 920 may be configured as or otherwise support a means for receiving an input at an interactive conversation service that uses an intent classification model. The communications manager 920 may be configured as or otherwise support a means for generating, using an encoder model of the intent classification model, a set of output vectors corresponding to the input, where the encoder model is configured to determine a set of metrics corresponding to multiple intent classifications. The communications manager 920 may be configured as or otherwise support a means for determining, using an outlier detection model of the intent classification model, whether the input is in-domain or OOD based on a first vector of the set of output vectors satisfying a domain threshold relative to one or more of the multiple intent classifications. The communications manager 920 may be configured as or otherwise support a means for outputting, by the intent classification model, a second vector of the set of output vectors that indicating the set of metrics corresponding to the multiple intent classifications or an indication that the input is OOD based on the determining.

By including or configuring the communications manager 920 in accordance with examples as described herein, the device 905 may support techniques for performing intent classification with greater accuracy, reduced memory overhead, and decreased processing overhead, among other examples. For example, the techniques described herein may provide for configuring an intent classification model with various loss functions that may increase the likelihood of the intent classification model correctly identifying an intent of a chat utterance. Moreover, the described techniques may provide for configuring the intent classification model to support multiple different languages, as opposed to configuring different intent classification models for different languages. Using a multi-lingual intent classification model, also referred to herein as a cross-lingual intent classification model, may result in lower processing overhead, reduced memory overhead, and higher user satisfaction, among other benefits.

Figure 10:
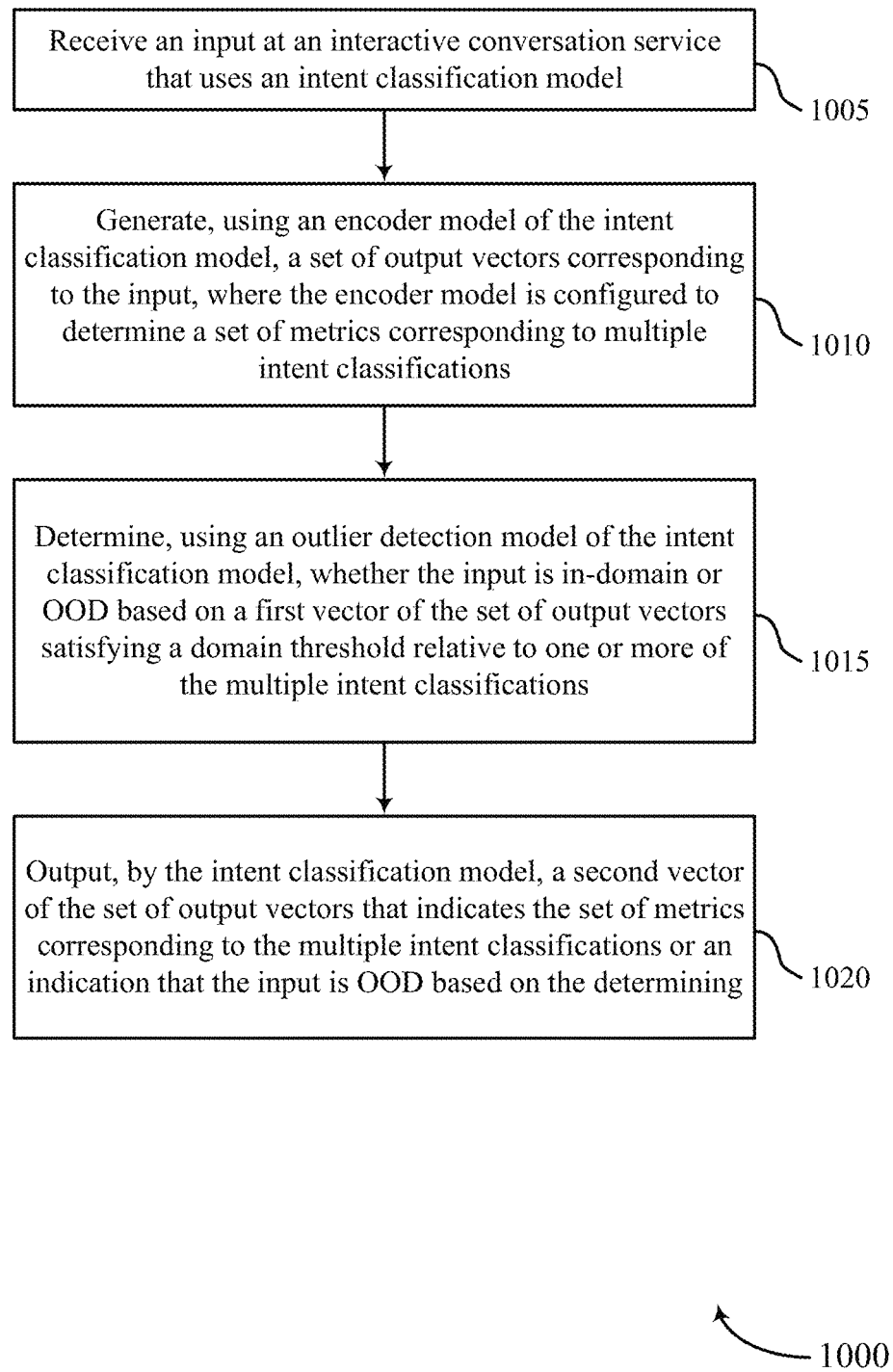
FIGS. 10 through 13 show flowcharts illustrating methods that support an intent model with OOD detection in accordance with aspects of the present disclosure.

FIG. 10 shows a flowchart illustrating a method 1000 that supports a multi-lingual intent model with OOD detection in accordance with aspects of the present disclosure. The operations of the method 1000 may be implemented by an application server or components of an application server as described herein. For example, the operations of the method 1000 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1005, the method may include receiving an input at an interactive conversation service that uses an intent classification model. The operations of 1005 may be performed in accordance with examples as disclosed herein. In some examples, aspects of the operations of 1005 may be performed by an input receiving component 825 as described with reference to FIG. 8.

At 1010, the method may include generating, using an encoder model of the intent classification model, a set of output vectors corresponding to the input, where the encoder model is configured to determine a set of metrics corresponding to multiple intent classifications. The operations of 1010 may be performed in accordance with examples as disclosed herein. In some examples, aspects of the operations of 1010 may be performed by a vector generating component 830 as described with reference to FIG. 8.

At 1015, the method may include determining, using an outlier detection model of the intent classification model, whether the input is in-domain or OOD based on a first vector of the set of output vectors satisfying a domain threshold relative to one or more of the multiple intent classifications. The operations of 1015 may be performed in accordance with examples as disclosed herein. In some examples, aspects of the operations of 1015 may be performed by a domain determining component 835 as described with reference to FIG. 8.

At 1020, the method may include outputting, by the intent classification model, a second vector of the set of output vectors that indicates the set of metrics corresponding to the multiple intent classifications or an indication that the input is OOD based on the determining. The operations of 1020 may be performed in accordance with examples as disclosed herein. In some examples, aspects of the operations of 1020 may be performed by a vector outputting component 840 as described with reference to FIG. 8.

Figure 11:
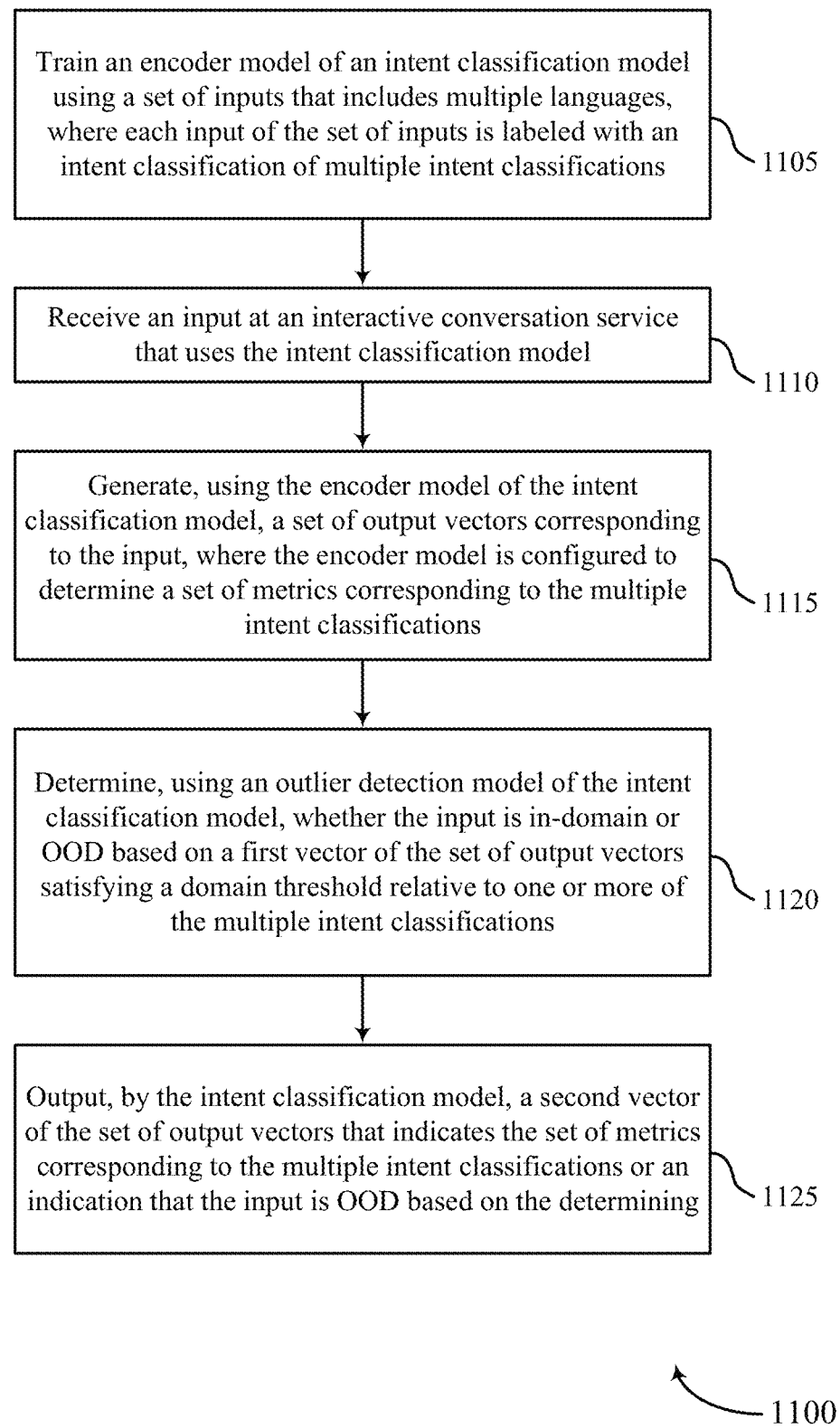

FIG. 11 shows a flowchart illustrating a method 1100 that supports a multi-lingual intent model with OOD detection in accordance with aspects of the present disclosure. The operations of the method 1100 may be implemented by an application server or components of an application server as described herein. For example, the operations of the method 1100 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1105, the method may include training an encoder model of an intent classification model using a set of inputs that includes multiple languages, where each input of the set of inputs is labeled with an intent classification of multiple intent classifications. The operations of 1105 may be performed in accordance with examples as disclosed herein. In some examples, aspects of the operations of 1105 may be performed by a model training component 845 as described with reference to FIG. 8.

At 1110, the method may include receiving an input at an interactive conversation service that uses the intent classification model. The operations of 1110 may be performed in accordance with examples as disclosed herein. In some examples, aspects of the operations of 1110 may be performed by an input receiving component 825 as described with reference to FIG. 8.

At 1115, the method may include generating, using the encoder model of the intent classification model, a set of output vectors corresponding to the input, where the encoder model is configured to determine a set of metrics corresponding to the multiple intent classifications. The operations of 1115 may be performed in accordance with examples as disclosed herein. In some examples, aspects of the operations of 1115 may be performed by a vector generating component 830 as described with reference to FIG. 8.

At 1120, the method may include determining, using an outlier detection model of the intent classification model, whether the input is in-domain or OOD based on a first vector of the set of output vectors satisfying a domain threshold relative to one or more of the multiple intent classifications. The operations of 1120 may be performed in accordance with examples as disclosed herein. In some examples, aspects of the operations of 1120 may be performed by a domain determining component 835 as described with reference to FIG. 8.

At 1125, the method may include outputting, by the intent classification model, a second vector of the set of output vectors that indicates the set of metrics corresponding to the multiple intent classifications or an indication that the input is OOD based on the determining. The operations of 1125 may be performed in accordance with examples as disclosed herein. In some examples, aspects of the operations of 1125 may be performed by a vector outputting component 840 as described with reference to FIG. 8.

Figure 12:
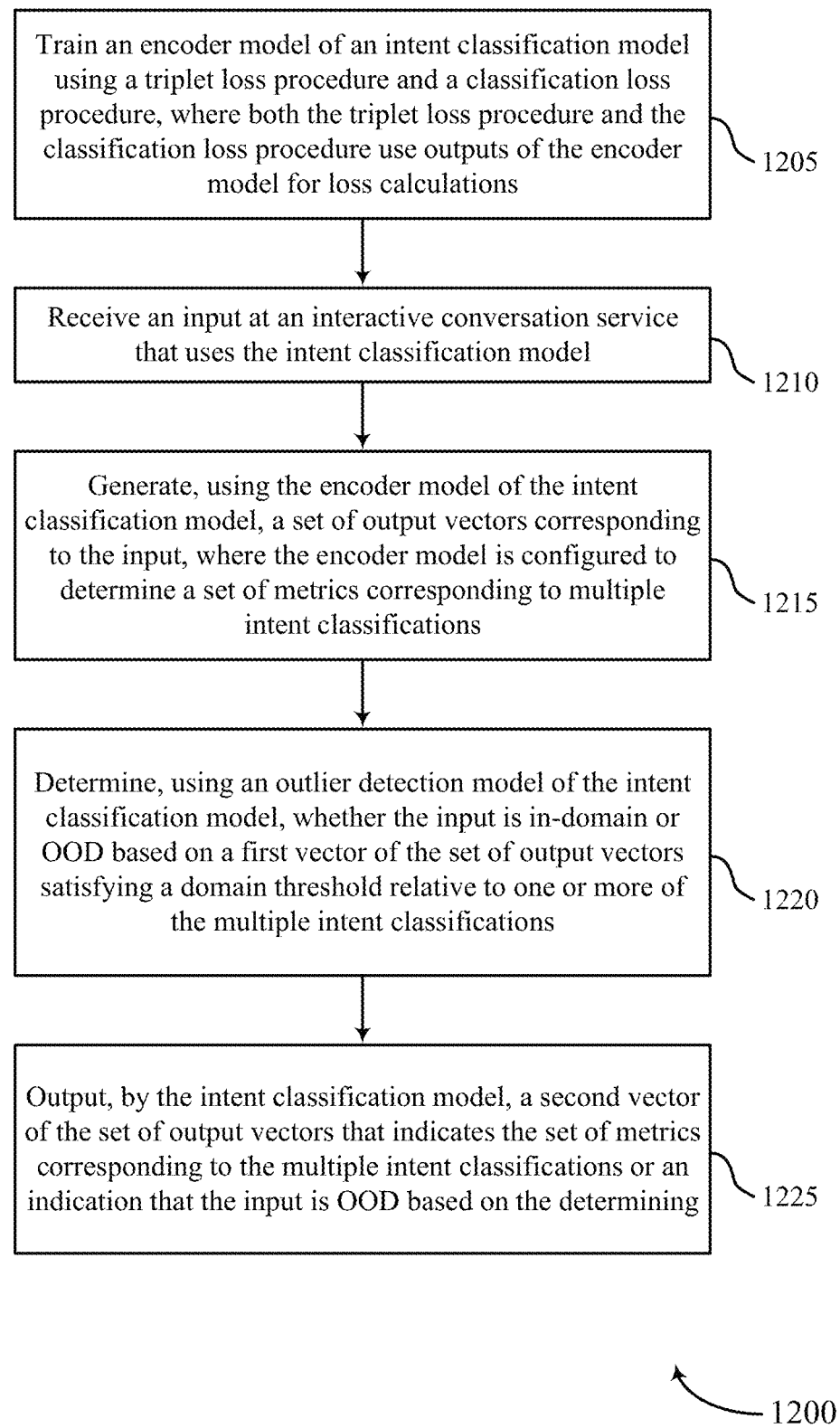

FIG. 12 shows a flowchart illustrating a method 1200 that supports a multi-lingual intent model with OOD detection in accordance with aspects of the present disclosure. The operations of the method 1200 may be implemented by an application server or components of an application server as described herein. For example, the operations of the method 1200 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1205, the method may include training an encoder model of an intent classification model using a triplet loss procedure and a classification loss procedure, where both the triplet loss procedure and the classification loss procedure use outputs of the encoder model for loss calculations. The operations of 1205 may be performed in accordance with examples as disclosed herein. In some examples, aspects of the operations of 1205 may be performed by a model training component 845 as described with reference to FIG. 8.

At 1210, the method may include receiving an input at an interactive conversation service that uses the intent classification model. The operations of 1210 may be performed in accordance with examples as disclosed herein. In some examples, aspects of the operations of 1210 may be performed by an input receiving component 825 as described with reference to FIG. 8.

At 1215, the method may include generating, using the encoder model of the intent classification model, a set of output vectors corresponding to the input, where the encoder model is configured to determine a set of metrics corresponding to multiple intent classifications. The operations of 1215 may be performed in accordance with examples as disclosed herein. In some examples, aspects of the operations of 1215 may be performed by a vector generating component 830 as described with reference to FIG. 8.

At 1220, the method may include determining, using an outlier detection model of the intent classification model, whether the input is in-domain or OOD based on a first vector of the set of output vectors satisfying a domain threshold relative to one or more of the multiple intent classifications. The operations of 1220 may be performed in accordance with examples as disclosed herein. In some examples, aspects of the operations of 1220 may be performed by a domain determining component 835 as described with reference to FIG. 8.

At 1225, the method may include outputting, by the intent classification model, a second vector of the set of output vectors that indicates the set of metrics corresponding to the multiple intent classifications or an indication that the input is OOD based on the determining. The operations of 1225 may be performed in accordance with examples as disclosed herein. In some examples, aspects of the operations of 1225 may be performed by a vector outputting component 840 as described with reference to FIG. 8.

Figure 13:
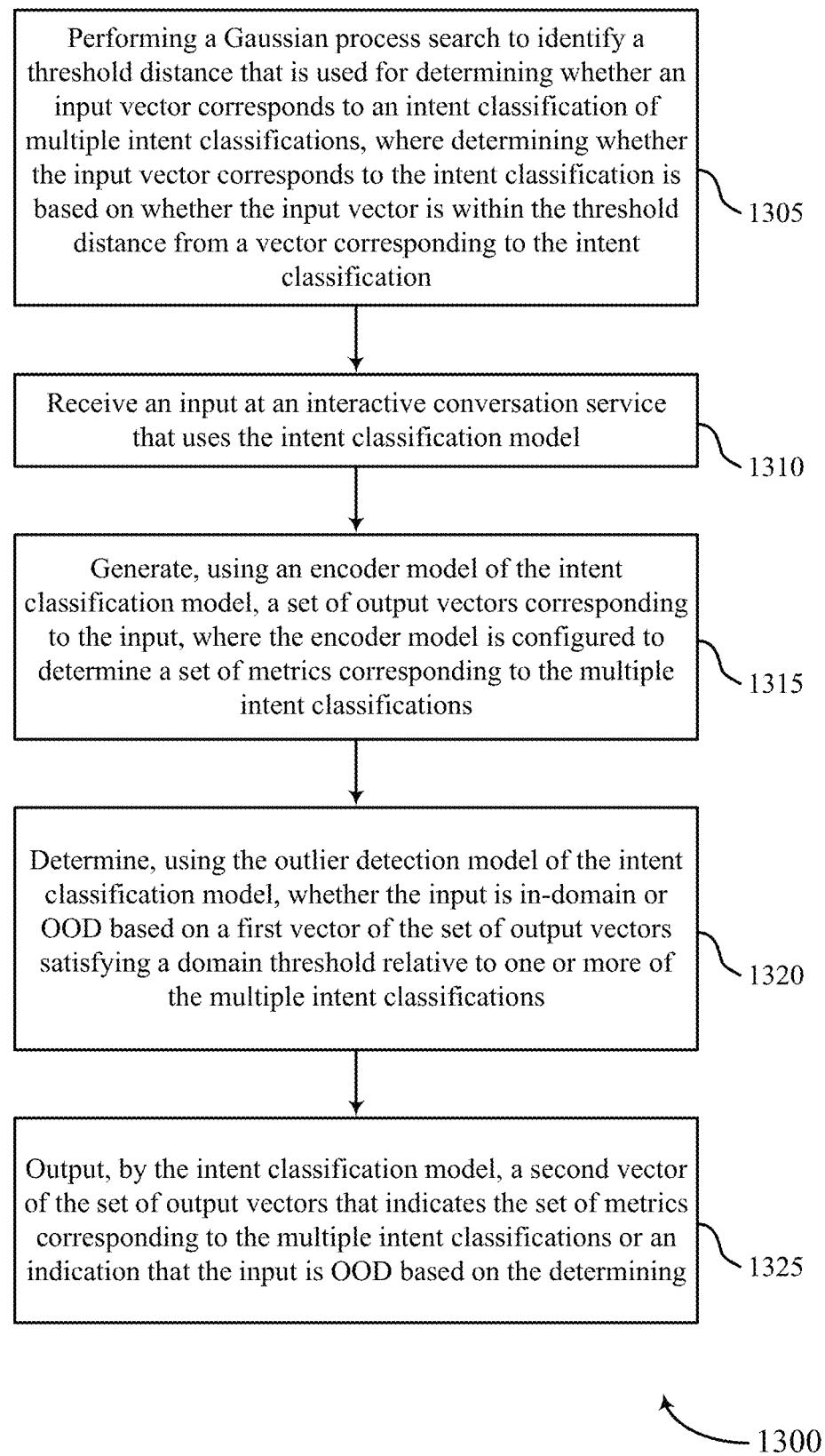

FIG. 13 shows a flowchart illustrating a method 1300 that supports a multi-lingual intent model with OOD detection in accordance with aspects of the present disclosure. The operations of the method 1300 may be implemented by an application server or components of an application server as described herein. For example, the operations of the method 1300 may be performed by an application server as described with reference to FIGS. 1 through 9. In some examples, an application server may execute a set of instructions to control the functional elements of the application server to perform the described functions. Additionally or alternatively, the application server may perform aspects of the described functions using special-purpose hardware.

At 1305, the method may include performing a Gaussian process search to identify a threshold distance that is used for determining whether an input vector corresponds to an intent classification of multiple intent classifications, where determining whether the input vector corresponds to the intent classification is based on whether the input vector is within the threshold distance from a vector corresponding to the intent classification. The operations of 1305 may be performed in accordance with examples as disclosed herein. In some examples, aspects of the operations of 1305 may be performed by a model training component 845 as described with reference to FIG. 8.

At 1310, the method may include receiving an input at an interactive conversation service that uses the intent classification model. The operations of 1310 may be performed in accordance with examples as disclosed herein. In some examples, aspects of the operations of 1310 may be performed by an input receiving component 825 as described with reference to FIG. 8.

At 1315, the method may include generating, using an encoder model of the intent classification model, a set of output vectors corresponding to the input, where the encoder model is configured to determine a set of metrics corresponding to the multiple intent classifications. The operations of 1315 may be performed in accordance with examples as disclosed herein. In some examples, aspects of the operations of 1315 may be performed by a vector generating component 830 as described with reference to FIG. 8.

At 1320, the method may include determining, using the outlier detection model of the intent classification model, whether the input is in-domain or OOD based on a first vector of the set of output vectors satisfying a domain threshold relative to one or more of the multiple intent classifications. The operations of 1320 may be performed in accordance with examples as disclosed herein. In some examples, aspects of the operations of 1320 may be performed by a domain determining component 835 as described with reference to FIG. 8.

At 1325, the method may include outputting, by the intent classification model, a second vector of the set of output vectors that indicates the set of metrics corresponding to the multiple intent classifications or an indication that the input is OOD based on the determining. The operations of 1325 may be performed in accordance with examples as disclosed herein. In some examples, aspects of the operations of 1325 may be performed by a vector outputting component 840 as described with reference to FIG. 8.

A method for data processing is described. The method may include receiving an input at an interactive conversation service that uses an intent classification model, generating, using an encoder model of the intent classification model, a set of output vectors corresponding to the input, where the encoder model is configured to determine a set of metrics corresponding to multiple intent classifications, determining, using an outlier detection model of the intent classification model, whether the input is in-domain or OOD based on a first vector of the set of output vectors satisfying a domain threshold relative to one or more of the multiple intent classifications, and outputting, by the intent classification model, a second vector of the set of output vectors that indicates the set of metrics corresponding to the multiple intent classifications or an indication that the input is OOD based on the determining.

An apparatus for data processing is described. The apparatus may include a processor, memory coupled with the processor, and instructions stored in the memory. The instructions may be executable by the processor to cause the apparatus to receive an input at an interactive conversation service that uses an intent classification model, generate, using an encoder model of the intent classification model, a set of output vectors corresponding to the input, where the encoder model is configured to determine a set of metrics corresponding to multiple intent classifications, determine, using an outlier detection model of the intent classification model, whether the input is in-domain or OOD based on a first vector of the set of output vectors satisfying a domain threshold relative to one or more of the multiple intent classifications, and outputting, by the intent classification model, a second vector of the set of output vectors that indicate the set of metrics corresponding to the multiple intent classifications or an indication that the input is OOD based on the determining.

Another apparatus for data processing is described. The apparatus may include means for receiving an input at an interactive conversation service that uses an intent classification model, means for generating, using an encoder model of the intent classification model, a set of output vectors corresponding to the input, where the encoder model is configured to determine a set of metrics corresponding to multiple intent classifications, means for determining, using an outlier detection model of the intent classification model, whether the input is in-domain or OOD based on a first vector of the set of output vectors satisfying a domain threshold relative to one or more of the multiple intent classifications, and means for outputting, by the intent classification model, a second vector of the set of output vectors that indicates the set of metrics corresponding to the multiple intent classifications or an indication that the input is OOD based on the determining.

A non-transitory computer-readable medium storing code for data processing is described. The code may include instructions executable by a processor to receive an input at an interactive conversation service that uses an intent classification model, generate, using an encoder model of the intent classification model, a set of output vectors corresponding to the input, where the encoder model is configured to determine a set of metrics corresponding to multiple intent classifications, determine, using an outlier detection model of the intent classification model, whether the input is in-domain or OOD based on a first vector of the set of output vectors satisfying a domain threshold relative to one or more of the multiple intent classifications, and outputting, by the intent classification model, a second vector of the set of output vectors that indicate the set of metrics corresponding to the multiple intent classifications or an indication that the input is OOD based on the determining.

Some examples of the method, apparatuses, and non-transitory computer-readable medium described herein may further include operations, features, means, or instructions for training the encoder model of the intent classification model using a set of inputs that may be comprised of multiple languages, where each input of the set of inputs may be labeled with an intent classification of the multiple intent classifications.

Some examples of the method, apparatuses, and non-transitory computer-readable medium described herein may further include operations, features, means, or instructions for training the encoder model of the intent classification model using a triplet loss procedure and a classification loss procedure, where both the triplet loss procedure and the classification loss procedure use outputs of the encoder model for loss calculations.

In some examples of the method, apparatuses, and non-transitory computer-readable medium described herein, the triplet loss procedure may be a triplet semi-hard loss procedure and the classification loss procedure may be a cross-entropy loss procedure.

In some examples of the method, apparatuses, and non-transitory computer-readable medium described herein, the outlier detection model of the intent classification model may include a Gaussian mixture model that is trained using a set of input vectors, each input vector of the set of input vectors corresponding to an intent classification of the multiple intent classifications.

Some examples of the method, apparatuses, and non-transitory computer-readable medium described herein may further include operations, features, means, or instructions for performing a Gaussian process search to identify a threshold distance that is used for determining whether an input vector corresponds to an intent classification of the multiple intent classifications, where determining whether the input vector corresponds to the intent classification is based on whether the input vector is within the threshold distance from a vector corresponding to the intent classification.

In some examples of the method, apparatuses, and non-transitory computer-readable medium described herein, training the outlier detection model may include operations, features, means, or instructions for applying an objective function of the Gaussian process search that applies a score to each threshold distance of a set of possible threshold distances based on a set of input vectors being classified to the one or more of the multiple intent classifications and selecting a threshold distance from the set of possible threshold distances based on a highest score applied to the set of possible threshold distances.

In some examples of the method, apparatuses, and non-transitory computer-readable medium described herein, training the outlier detection model may include operations, features, means, or instructions for selecting a threshold distance for each intent classification of the multiple intent classifications.

In some examples of the method, apparatuses, and non-transitory computer-readable medium described herein, determining whether the input may be in-domain or OOD may include operations, features, means, or instructions for applying a SoftMax function to one of the set of output vectors resulting in a logits, applying a Gaussian mixture model of the outlier detection model to the logits and to a normalized output vector of the set of output vectors, and determining whether the input may be in-domain or OOD based on a highest score resulting from the Gaussian mixture model being applied to the logits and the normalized output vector, where the first vector corresponds to either the logits or the normalized output vector that results in the highest score.

In some examples of the method, apparatuses, and non-transitory computer-readable medium described herein, and the method, apparatuses, and non-transitory computer-readable medium may include further operations, features, means, or instructions for determining, using the outlier detection model of the intent classification model, that the input may be in-domain based on the first vector, where the second vector resulting from application of a SoftMax function may be output by the intent classification model based on determining that the input may be in-domain.

In some examples of the method, apparatuses, and non-transitory computer-readable medium described herein, the encoder model comprises a word embedding function and a single layer transformer.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   receiving an input at an interactive conversation service that uses an intent classification model;
   generating, using an encoder model of the intent classification model, a set of output vectors corresponding to the input, wherein the encoder model is configured to determine a set of metrics corresponding to a plurality of intent classifications;
   determining, using an outlier detection model of the intent classification model, whether the input is in-domain or out-of-domain based at least in part on a first vector of the set of output vectors satisfying a domain threshold relative to one or more of the plurality of intent classifications, wherein the domain threshold is a threshold distance generated using a Gaussian process search for in-domain data and the determining is based at least in part on the first vector being within the threshold distance to one or more intent classifications of the plurality of intent classifications; and
   outputting, by the intent classification model, a second vector of the set of output vectors that indicates the set of metrics corresponding to the plurality of intent classifications or an indication that the input is out-of-domain based at least in part on the determining.

2. The method of claim 1, further comprising:
   training the encoder model of the intent classification model using a set of inputs that is comprised of a plurality of languages, wherein each input of the set of inputs is labeled with an intent classification of the plurality of intent classifications.

3. The method of claim 1, further comprising:
   training the encoder model of the intent classification model using a triplet loss procedure and a classification loss procedure, wherein both the triplet loss procedure and the classification loss procedure make use of outputs of the encoder model for loss calculations.

4. The method of claim 3, wherein the triplet loss procedure is a triplet semi-hard loss procedure and the classification loss procedure is a cross-entropy loss procedure.

5. The method of claim 1, wherein the outlier detection model of the intent classification model comprises a Gaussian mixture model that is trained using a set of input vectors, each input vector of the set of input vectors corresponding to an intent classification of the plurality of intent classifications.

6. The method of claim 1, further comprising:
   performing the Gaussian process search to identify the threshold distance that is used for determining whether an input vector corresponds to an intent classification of the plurality of intent classifications, wherein determining whether the input vector corresponds to the intent classification is based at least in part on whether the input vector is within the threshold distance from a vector corresponding to the intent classification.

7. The method of claim 6, wherein training the outlier detection model comprises:
applying an objective function of the Gaussian process search that applies a score to each threshold distance of a set of possible threshold distances based on a set of input vectors being classified to the one or more of the plurality of intent classifications; and
selecting the threshold distance from the set of possible threshold distances based at least in part on a highest score applied to the set of possible threshold distances.

8. The method of claim 5, wherein training the outlier detection model comprises:
selecting a respective threshold distance for each intent classification of the plurality of intent classifications.

9. The method of claim 1, wherein determining whether the input is in-domain or out-of-domain comprises:
applying a SoftMax function to one of the set of output vectors resulting in a logits;
applying a Gaussian mixture model of the outlier detection model to the logits and to a normalized output vector of the set of output vectors; and
determining whether the input is in-domain or out-of-domain based at least in part on a highest score resulting from the Gaussian mixture model being applied to the logits and the normalized output vector, wherein the first vector corresponds to either the logits or the normalized output vector that results in the highest score.

10. The method of claim 1, wherein determining whether the input is in-domain or out-of-domain comprises:
determining, using the outlier detection model of the intent classification model, that the input is in-domain based at least in part on the first vector, wherein the intent classification model outputs the second vector as a result of an application of a SoftMax function based at least in part on determining that the input is in-domain.

11. The method of claim 1, wherein the encoder model comprises a word embedding function and a single layer transformer.

12. An apparatus for data processing, comprising:
a processor;
memory coupled with the processor; and
instructions stored in the memory and executable by the processor to cause the apparatus to:
receive an input at an interactive conversation service that uses an intent classification model;
generate, using an encoder model of the intent classification model, a set of output vectors corresponding to the input, wherein the encoder model is configured to determine a set of metrics corresponding to a plurality of intent classifications;
determine, using an outlier detection model of the intent classification model, whether the input is in-domain or out-of-domain based at least in part on a first vector of the set of output vectors satisfying a domain threshold relative to one or more of the plurality of intent classifications, wherein the domain threshold is a threshold distance generated using a Gaussian process search for in-domain data and the determining is based at least in part on the first vector being within the threshold distance to one or more intent classifications of the plurality of intent classifications; and
output, by the intent classification model, a second vector of the set of output vectors that indicate the set of metrics corresponding to the plurality of intent classifications or an indication that the input is out-of-domain based at least in part on the determining.

13. The apparatus of claim 12, wherein the instructions are further executable by the processor to cause the apparatus to:
train the encoder model of the intent classification model using a set of inputs that is comprised of a plurality of languages, wherein each input of the set of inputs is labeled with an intent classification of the plurality of intent classifications.

14. The apparatus of claim 12, wherein the instructions are further executable by the processor to cause the apparatus to:
train the encoder model of the intent classification model using a triplet loss procedure and a classification loss procedure, wherein both the triplet loss procedure and the classification loss procedure make use of outputs of the encoder model for loss calculations.

15. The apparatus of claim 14, wherein the triplet loss procedure is a triplet semi-hard loss procedure and the classification loss procedure is a cross-entropy loss procedure.

16. The apparatus of claim 12, wherein the outlier detection model of the intent classification model comprises a Gaussian mixture model that is trained using a set of input vectors, each input vector of the set of input vectors corresponding to an intent classification of the plurality of intent classifications.

17. The apparatus of claim 12, wherein the instructions are further executable by the processor to cause the apparatus to:
perform the Gaussian process search to identify the threshold distance that is used for determining whether an input vector corresponds to an intent classification of the plurality of intent classifications, wherein determining whether the input vector corresponds to the intent classification is based at least in part on whether the input vector is within the threshold distance from a vector corresponding to the intent classification.

18. The apparatus of claim 17, wherein the instructions to train the outlier detection model are executable by the processor to cause the apparatus to:
apply an objective function of the Gaussian process search that applies a score to each threshold distance of a set of possible threshold distances based on a set of input vectors being classified to the one or more of the plurality of intent classifications; and
select the threshold distance from the set of possible threshold distances based at least in part on a highest score applied to the set of possible threshold distances.

19. The apparatus of claim 12, wherein the instructions to determine whether the input is in-domain or out-of-domain are executable by the processor to cause the apparatus to:
apply a SoftMax function to one of the set of output vectors resulting in a logits;
apply a Gaussian mixture model of the outlier detection model to the logits and to a normalized output vector of the set of output vectors; and
determine whether the input is in-domain or out-of-domain based at least in part on a highest score resulting from the Gaussian mixture model being applied to the logits and the normalized output vector, wherein the first vector corresponds to either the logits or the normalized output vector that results in the highest score.

20. A non-transitory computer-readable medium storing code for data processing, the code comprising instructions executable by a processor to:
   receive an input at an interactive conversation service that uses an intent classification model;
   generate, using an encoder model of the intent classification model, a set of output vectors corresponding to the input, wherein the encoder model is configured to determine a set of metrics corresponding to a plurality of intent classifications;
   determine, using an outlier detection model of the intent classification model, whether the input is in-domain or out-of-domain based at least in part on a first vector of the set of output vectors satisfying a domain threshold relative to one or more of the plurality of intent classifications, wherein the domain threshold is a threshold distance generated using a Gaussian process search for in-domain data and the determining is based at least in part on the first vector being within the threshold distance to one or more intent classifications of the plurality of intent classifications; and
   output, by the intent classification model, a second vector of the set of output vectors that indicate the set of metrics corresponding to the plurality of intent classifications or an indication that the input is out-of-domain based at least in part on the determining.

* * * * *